(12) United States Patent
Henry et al.

(10) Patent No.: US 7,134,005 B2
(45) Date of Patent: Nov. 7, 2006

(54) MICROPROCESSOR THAT DETECTS ERRONEOUS SPECULATIVE PREDICTION OF BRANCH INSTRUCTION OPCODE BYTE

(75) Inventors: G. Glenn Henry, Austin, TX (US); Thomas C. McDonald, Austin, TX (US); Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 542 days.

(21) Appl. No.: 09/849,658

(22) Filed: May 4, 2001

(65) Prior Publication Data

US 2002/0194460 A1    Dec. 19, 2002

(51) Int. Cl.
*G06F 15/00* (2006.01)

(52) U.S. Cl. .................. 712/240; 712/238
(58) Field of Classification Search ........ 712/233–244, 712/208–211
See application file for complete search history.

(56) References Cited

U.S. PATENT DOCUMENTS

| | | | |
|---|---|---|---|
| 4,181,942 A | | 1/1980 | Forster et al. |
| 4,200,927 A | | 4/1980 | Hughes et al. |
| 4,860,197 A | | 8/1989 | Langendorf et al. |
| 5,142,634 A | * | 8/1992 | Fite et al. .................. 712/240 |
| 5,163,140 A | * | 11/1992 | Stiles et al. .................. 711/140 |
| 5,313,634 A | | 5/1994 | Eickemeyer |
| 5,353,421 A | | 10/1994 | Emma et al. |
| 5,355,459 A | | 10/1994 | Matsuo et al. |
| 5,394,530 A | | 2/1995 | Kitta |
| 5,404,467 A | | 4/1995 | Saba et al. |
| 5,434,985 A | | 7/1995 | Emma et al. |
| 5,513,330 A | | 4/1996 | Stiles |
| 5,530,825 A | | 6/1996 | Black et al. |
| 5,553,246 A | | 9/1996 | Suzuki |
| 5,604,877 A | * | 2/1997 | Hoyt et al. .................. 712/243 |
| 5,623,614 A | | 4/1997 | Van Dyke et al. |
| 5,623,615 A | | 4/1997 | Salem et al. |
| 5,634,103 A | | 5/1997 | Dietz et al. |
| 5,687,349 A | | 11/1997 | McGarity |
| 5,687,360 A | | 11/1997 | Chang |
| 5,706,491 A | | 1/1998 | McMahan |
| 5,721,855 A | | 2/1998 | Hinton et al. |

(Continued)

OTHER PUBLICATIONS

Microprocessor Report, vol. 9, No. 2, Feb. 16, 1995, p. 5.

(Continued)

*Primary Examiner*—Fritz Fleming
*Assistant Examiner*—Tonia L. Meonske
(74) *Attorney, Agent, or Firm*—E. Alan Davis; James W. Huffman

(57) ABSTRACT

A microprocessor caches in a branch target address cache (BTAC), for each of a plurality of previously executed branch instructions: a prediction of whether the branch instruction will be taken and is present in a cache line of instruction bytes provided by an instruction cache in response to a fetch address, a target address of the branch instruction, and a location of an opcode byte of the branch instruction within the cache line. The instruction cache provides the cache line to an instruction buffer and the BTAC provides the prediction, the target address, and the location in response to the fetch address. The microprocessor branches to the target address. A byte in the cache line within the instruction buffer indicated by the location provided by the BTAC is marked. An instruction decoder formats the instruction bytes in the cache line. The microprocessor erroneously branched to the target address if the instruction decoder indicates the marked byte is in a non-opcode location within one of the formatted instructions.

15 Claims, 19 Drawing Sheets

Detection and Correction of Speculative Branch Misprediction

U.S. PATENT DOCUMENTS

| | | |
|---|---|---|
| 5,734,881 A | 3/1998 | White et al. |
| 5,752,069 A | 5/1998 | Roberts et al. |
| 5,761,723 A | 6/1998 | Black et al. |
| 5,768,576 A | 6/1998 | Hoyt et al. |
| 5,805,877 A | 9/1998 | Black et al. |
| 5,812,839 A | 9/1998 | Hoyt et al. |
| 5,828,901 A | 10/1998 | O'Toole et al. |
| 5,832,289 A | 11/1998 | Shaw et al. |
| 5,850,532 A | 12/1998 | Narayan et al. |
| 5,850,543 A | 12/1998 | Shiell et al. |
| 5,864,707 A | 1/1999 | Tran et al. |
| 5,867,701 A * | 2/1999 | Brown et al. ............... 712/248 |
| 5,881,260 A | 3/1999 | Raje et al. |
| 5,881,265 A | 3/1999 | McFarland et al. |
| 5,931,944 A | 8/1999 | Ginosar et al. |
| 5,948,100 A | 9/1999 | Hsu et al. |
| 5,961,629 A | 10/1999 | Nguyen et al. |
| 5,964,868 A * | 10/1999 | Gochman et al. ........... 712/234 |
| 5,968,169 A | 10/1999 | Pickett |
| 5,974,543 A | 10/1999 | Hilgendorf et al. |
| 5,978,909 A | 11/1999 | Lempel |
| 6,035,391 A | 3/2000 | Isaman |
| 6,041,405 A | 3/2000 | Green |
| 6,044,459 A | 3/2000 | Bae et al. |
| 6,081,884 A | 6/2000 | Miller |
| 6,085,311 A | 7/2000 | Narayan et al. |
| 6,088,793 A | 7/2000 | Liu et al. |
| 6,101,595 A | 8/2000 | Pickett et al. |
| 6,108,773 A | 8/2000 | Col et al. |
| 6,122,729 A | 9/2000 | Tran |
| 6,134,654 A | 10/2000 | Patel et al. |
| 6,151,671 A | 11/2000 | D'Sa et al. |
| 6,157,988 A | 12/2000 | Dowling |
| 6,170,054 B1 | 1/2001 | Poplingher |
| 6,175,897 B1 | 1/2001 | Ryan et al. |
| 6,185,676 B1 | 2/2001 | Poplingher et al. |
| 6,233,676 B1 | 5/2001 | Henry et al. |
| 6,250,821 B1 | 6/2001 | Schwendinger |
| 6,256,727 B1 | 7/2001 | McDonald |
| 6,260,138 B1 | 7/2001 | Harris |
| 6,279,105 B1 | 8/2001 | Konigsburg et al. |
| 6,279,106 B1 | 8/2001 | Roberts |
| 6,308,259 B1 | 10/2001 | Witt |
| 6,314,514 B1 | 11/2001 | McDonald |
| 6,321,321 B1 | 11/2001 | Johnson |
| 6,351,796 B1 | 2/2002 | McCormick et al. |
| 6,374,350 B1 | 4/2002 | D'Sa et al. |
| 6,457,120 B1 | 9/2002 | Sinharoy |
| 6,502,185 B1 | 12/2002 | Keller et al. |
| 6,560,696 B1 | 5/2003 | Hummel et al. |
| 6,601,161 B1 | 7/2003 | Rappoport et al. |
| 6,647,467 B1 | 11/2003 | Dowling |
| 6,725,357 B1 | 4/2004 | Cousin |
| 6,748,441 B1 | 6/2004 | Gemmell |
| 6,754,808 B1 | 6/2004 | Roth et al. |
| 6,823,444 B1 | 11/2004 | Henry et al. |
| 6,898,699 B1 | 5/2005 | Jourdan et al. |
| 6,968,444 B1 | 11/2005 | Kroesche et al. |
| 2004/0030866 A1 | 2/2004 | McDonald |
| 2004/0139281 A1 | 7/2004 | McDonald |
| 2004/0139292 A1 | 7/2004 | McDonald |
| 2004/0139301 A1 | 7/2004 | McDonald |
| 2004/0143709 A1 | 7/2004 | McDonald |
| 2004/0143727 A1 | 7/2004 | McDonald |
| 2005/0044343 A1 | 2/2005 | Henry et al. |
| 2005/0076193 A1 | 4/2005 | Henry et al. |
| 2005/0198479 A1 | 9/2005 | Bean et al. |
| 2005/0198481 A1 | 9/2005 | Henry et al. |

OTHER PUBLICATIONS

Microprocessor Report, Aug. 23, 1999, p. 7.

Sakamoto et al; *Microarchitecture Support for Reducing Branch Penalty in a Superscaler Processor*; pp. 208-216; IEEE 1996; Mitsubishi Electric Corp., System LSI Laboratory, 4-1 Mizuhara, Itami, Hyogo 664, Japan.

Yeh et al; *Alternative Implementation of Two-Level Adaptive Branch Prediction*; 19th Annual International Symposium on Computer Architecture, pp. 124-134, May 19-21, 1992, Gold Coast, Australia.

Chang et al; *Alternative Implementations of Hybrid Branch Predictors*; Proceedings of Micro-28, 1995, IEEE.

Mc Farling, Scott; *WRL Technical Note TN-36*, Combining Branch Predictors, Jun. 1993, Western Research Laboratory, 250 University Ave., Palo Alto, CA 94301.

IEEE 100; *The Authoritative Dictionary of IEEE Standards Terms*; Seventh Edition, IEEE, Standards Information Network, IEEE Press.

Bray et al; *Strategies for Branch Target Buffers; Technical Report No. CSL-TR-91-480*, Jun. 1991.

Online Computing Dictionary. http://instantweb.com/d/dictionary/foldoc.cgi?query=bib May 5, 1995. Branch Target Buffer.

The D Latch, Play-Hookey Web Page, Oct. 10, 1999.

Patterson et al. "Computer Organization & Design: The Hardware/Software Interface." Morgan Kaufmann Publishers, Inc. San Francisco, CA. 1998 p. 469.

Jimenez et al. "The Impact of Delay on the Design of Branch Predictors." IEEE 2000 pp. 1-10.

Eberly et al. "The Correlation Branch Target Address Cache" IBM Technical Disclosure Bulletin May 1996, pp. 83-85, vol. 39 No. 5.

Patterson et al. "Computer Organization & Design: The Hardware/Software Interface." Morgan Kaufmann Publishers, Inc. San Francisco, CA. 1998 p. 453-456, Second Edition.

IBM Technical Disclosure Bulletin NN9204269, "Return Address Stack Cache." Apr. 1992, pp. 269-271.

* cited by examiner

Pentium II, III Branch Target Buffer

FIG. 5          Instruction Cache

Speculative Branching Operation

FIG. 9  Target Address Selection Example

Detection and Correction of Speculative Branch Misprediction

FIG. 11

Previous Code Sequence:

0x00000010    JMP    0x00001234

...

Current Code Sequence:

0x00000010    ADD    ;address 0x00000010 hits in BTAC generating a TA value of 0x00001234

...

0x00001234    SUB
0x00001236    INC

| clock → | 1 | 2 | 3 | 4 | 5 | 6 | 7 |
|---|---|---|---|---|---|---|---|
| I-stage | ADD | X | X | SUB | INC | X | ADD |
| B-stage |  | ADD | X | X | SUB | X | X |
| U-stage |  |  | ADD | X | X | X | X |
| V-stage |  |  |  | ADD | X | X | X |
| F-stage |  |  |  |  | ADD | X | X |

Cycle 1 = BTAC and I-cache access cycle
Cycle 4 = speculative branch cycle
Cycle 5 = speculative branch error detection cycle
Cycle 6 = BTAC invalidate cycle
Cycle 7 = speculative branch error correction cycle

*Misprediction Detection and Correction Example* ← 1100

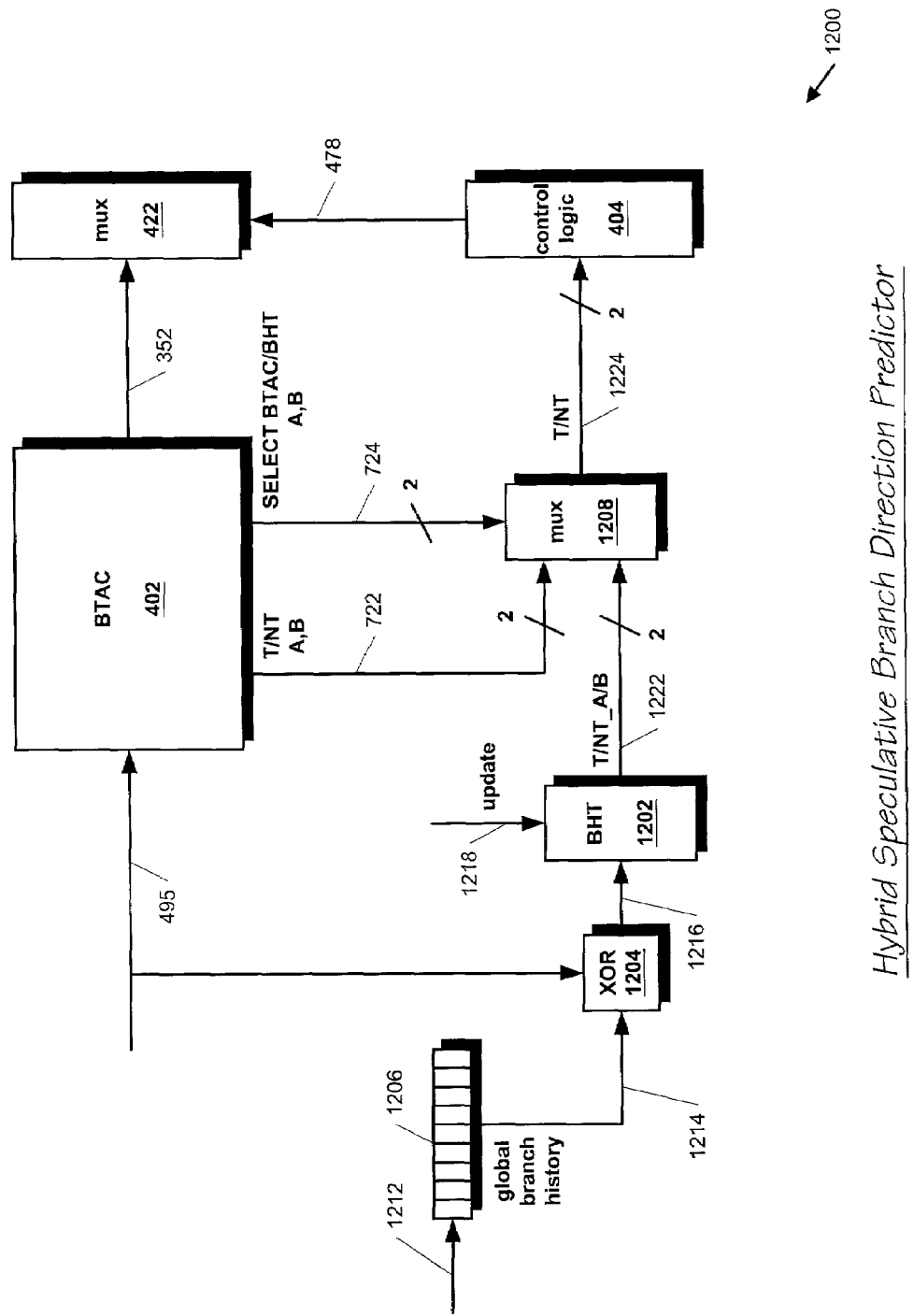

Dual CALL/RET Stack Operation

Selective Override of BTAC Prediction Operation

BTAC A/B Replacement Apparatus

A/B Entry Replacement Method

*A/B Entry Replacement Method (Alt. Embodiment)*

BTAC A/B Replacement Apparatus (Alt. Embodiment)

BTAC A/B/C Replacement Apparatus

MICROPROCESSOR THAT DETECTS ERRONEOUS SPECULATIVE PREDICTION OF BRANCH INSTRUCTION OPCODE BYTE

CROSS REFERENCE TO RELATED APPLICATIONS

This application is related to the following U.S. Patent applications, having a common filing date and a common assignee. Each of these applications is hereby incorporated by reference in its entirety for all purposes:

| Serial # | Title |
| --- | --- |
| 09/849736 | SPECULATIVE BRANCH TARGET ADDRESS CACHE |
| 09/849734 | SPECULATIVE HYBRID BRANCH DIRECTION PREDICTOR |
| 09/849822 | DUAL CALL/RETURN STACK BRANCH PREDICTION SYSTEM |
| 09/849799 | SPECULATIVE BRANCH TARGET ADDRESS CACHE WITH SELECTIVE OVERRIDE BY SECONDARY PREDICTOR BASED ON BRANCH INSTRUCTION TYPE |
| 09/849754 | APPARATUS AND METHOD FOR SELECTING ONE OF MULTIPLE TARGET ADDRESSES STORED IN A SPECULATIVE BRANCH TARGET ADDRESS CACHE PER INSTRUCTION CACHE LINE |
| 09/849800 | APPARATUS AND METHOD FOR TARGET ADDRESS REPLACEMENT IN SPECULATIVE BRANCH TARGET ADDRESS CACHE |

FIELD OF THE INVENTION

This invention relates in general to the field of branch prediction in microprocessors, and more particularly to branch target address caching.

BACKGROUND OF THE INVENTION

Computer instructions are typically stored in successive addressable locations within a memory. When processed by a Central Processing Unit (CPU), or processor, the instructions are fetched from consecutive memory locations and executed. Each time an instruction is fetched from memory, a program counter (PC), or instruction pointer (IP), within the CPU is incremented so that it contains the address of the next instruction in the sequence. This is the next sequential instruction pointer, or NSIP. Fetching of an instruction, incrementing of the program counter, and execution of the instruction continues linearly through memory until a program control instruction is encountered.

A program control instruction, also referred to as a branch instruction, when executed, changes the address in the program counter and causes the flow of control to be altered. In other words, branch instructions specify conditions for altering the contents of the program counter. The change in the value of the program counter because of the execution of a branch instruction causes a break in the sequence of instruction execution. This is an important feature in digital computers, as it provides control over the flow of program execution and a capability for branching to different portions of a program. Examples of program control instructions include jump, conditional jump, call, and return.

A jump instruction causes the CPU to unconditionally change the contents of the program counter to a specific value, i.e., to the target address for the instruction where the program is to continue execution. A conditional jump causes the CPU to test the contents of a status register, or possibly compare two values, and either continue sequential execution or jump to a new address, called the target address, based on the outcome of the test or comparison. A call instruction causes the CPU to unconditionally jump to a new target address, but also saves the value of the program counter to allow the CPU to return to the program location it is leaving. A return instruction causes the CPU to retrieve the value of the program counter that was saved by the last call instruction, and return program flow back to the retrieved instruction address.

In early microprocessors, execution of program control instructions did not impose significant processing delays because such microprocessors were designed to execute only one instruction at a time. If the instruction being executed was a program control instruction, by the end of execution the microprocessor would know whether it should branch, and if it was supposed to branch, it would know the target address of the branch. Thus, whether the next instruction was sequential, or the result of a branch, it would be fetched and executed.

Modern microprocessors are not so simple. Rather, it is common for modern microprocessors to operate on several instructions at the same time, within different blocks or pipeline stages of the microprocessor. Hennessy and Patterson define pipelining as, "an implementation technique whereby multiple instructions are overlapped in execution." *Computer Architecture: A Quantitative Approach*, $2^{nd}$ edition, by John L. Hennessy and David A. Patterson, Morgan Kaufmann Publishers, San Francisco, Calif. 1996. The authors go on to provide the following excellent illustration of pipelining:

"A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line."

Thus, as instructions are fetched, they are introduced into one end of the pipeline. They proceed through pipeline stages within a microprocessor until they complete execution. In such pipelined microprocessors, it is often not known whether a branch instruction will alter program flow until it reaches a late stage in the pipeline. However, by this time, the microprocessor has already fetched other instructions and is executing them in earlier stages of the pipeline. If a branch instruction causes a change in program flow, all of the instructions in the pipeline that followed the branch instruction must be thrown out. In addition, the instruction specified by the target address of the branch instruction must be fetched. Throwing out the intermediate instructions and fetching the instruction at the target address creates processing delays in such microprocessors, referred to as a branch penalty.

To alleviate this delay problem, many pipelined microprocessors use branch prediction mechanisms in an early stage of the pipeline that make predictions of branch instructions. The branch prediction mechanisms predict the outcome, or direction, of the branch instruction, i.e., whether the branch will be taken or not taken. The branch prediction mechanisms also predict the branch target address of the branch instruction, i.e., the address of the instruction that will be branched to by the branch instruction. The processor then branches to the predicted branch target address, i.e., fetches subsequent instructions according to the branch prediction, sooner than it would without the branch prediction, thereby potentially reducing the penalty if the branch is taken.

A branch prediction mechanism that caches target addresses of previously executed branch instructions is referred to as a branch target address cache (BTAC), or branch target buffer (BTB). In a simple BTAC or BTB, when the processor decodes a branch instruction, the processor provides the branch instruction address to the BTAC. If the address generates a hit in the BTAC and the branch is predicted taken, then the processor may use the cached target address from the BTAC to begin fetching instructions at the target address, rather than at the next sequential instruction address.

The benefit of the BTAC over a predictor that merely predicts taken/not taken, such as a branch history table (BHT) is that the BTAC saves the time needed to calculate the target address beyond the time needed to determine that a branch instruction has been encountered. Typically, branch prediction information (e.g., taken/not taken) is stored in the BTAC along with the target address. A BTAC is historically employed at the instruction decode stages of the pipeline. This is because the processor must first determine that a branch instruction is present.

An example of a processor that employs a BTB is the Intel® Pentium® II and III processor. Referring now to FIG. 1, a block diagram of relevant portions of a Pentium II/III processor 100 is shown. The processor 100 includes a BTB 134 that caches branch target addresses. The processor 100 fetches instructions from an instruction cache 102 that caches instructions 108 and pre-decoded branch prediction information 104. The pre-decoded branch prediction information 104 may include information such as an instruction type or an instruction length. Instructions are fetched from the instruction cache 102 and provided to instruction decode logic 132 that decodes, or translates, instructions.

Typically, instructions are fetched from a next sequential fetch address 112, which is simply the current instruction cache 102 fetch address 122 incremented by the size of an instruction cache 102 line by an incrementer 118. However, if a branch instruction is decoded by the instruction decode logic 132, then control logic 114 selectively controls a multiplexer 116 to select the branch target address 136 supplied by the BTB 134 as the fetch address 122 for the instruction cache 102 rather than selecting the next sequential fetch address 112. The control logic 114 selects the instruction cache 102 fetch address 122 based on the pre-decode information 104 from the instruction cache 102 and whether the BTB 134 predicts the branch instruction will be taken or not taken based on an instruction pointer 138 used to index the BTB 134.

Rather than indexing the BTB 134 with the instruction pointer of the branch instruction itself, the Pentium II/III indexes the BTB 134 with the instruction pointer 138 of an instruction prior to the branch instruction being predicted. This enables the BTB 134 to lookup the target address 136 while the branch instruction is being decoded. Otherwise, the processor 100 would have to wait to branch an additional branch penalty delay of waiting to perform the BTB 134 lookup after the branch instruction is decoded. Presumably, once the branch instruction is decoded by the instruction decode logic 132 and the processor 100 knows that the target address 136 was generated based on certainty that a branch instruction is present, only then does the processor 100 branch to the target address 136 provided by the BTB 134 based on the instruction pointer 138 index.

Another example of a processor that employs a BTAC is the AMD® Athlon® processor. Referring now to FIG. 2, a block diagram of relevant portions of an Athlon processor 200 is shown. The processor 200 includes similar elements to the Pentium II/III of FIG. 1 similarly labeled. The Athlon processor 200 integrates its BTAC into its instruction cache 202. That is, the instruction cache 202 caches branch target addresses 206 in addition to instruction data 108 and pre-decoded branch prediction information 104. For each instruction byte pair, the instruction cache 202 reserves two bits for predicting the direction of the branch instruction. The instruction cache 202 reserves space for two branch target addresses per 16-bytes worth of instructions in a line of the instruction cache 202.

As may be observed from FIG. 2, the instruction cache 202 is indexed by a fetch address 122. The BTAC is also indexed by the fetch address 122 because the BTAC is integrated into the instruction cache 202. Consequently, if a hit occurs for a line in the instruction cache 202, there is certainty that the cached branch target address 206 corresponds to a branch instruction existent in the indexed instruction cache 202 line.

Although the prior methods provide branch prediction improvements, there are disadvantages to the prior methods. A disadvantage of both the prior methods discussed above is that the instruction pre-decode information, and in the case of Athlon the branch target addresses, substantially increase the size of the instruction cache. It has been speculated that for Athlon the branch prediction information essentially doubles the size of the instruction cache. Additionally, the Pentium II/III BTB stores a relatively large amount of branch history information per branch instruction for predicting the branch direction, thereby increasing the size of the BTB.

A disadvantage of the Athlon integrated BTAC is that the integration of the BTAC into the instruction cache causes space usage inefficiency. That is, the integrated instruction cache/BTAC occupies storage space for caching branch instruction information for non-branch instructions as well as branch instructions. Much of the space taken up inside the Athlon instruction cache by the additional branch prediction information is wasted since the instruction cache has a relatively low concentration of branch instructions. For example, a given instruction cache line may have no branches in it, and thus all the space taken up by storing the target addresses and other branch prediction information in the line are unused and wasted.

Another disadvantage of the Athlon integrated BTAC is that of conflicting design goals. That is, the instruction cache size may be dictated by design goals that are different from the design goals of the branch prediction mechanism. Requiring the BTAC to be the same size as the instruction cache, in terms of cache lines, which is inherent in the Athlon scheme, may not optimally meet both sets of design goals. For example, the instruction cache size may be chosen to achieve a certain cache-hit ratio. However, it may be that the required branch target address prediction rate might have been achieved with a smaller BTAC.

Furthermore, because the BTAC is integrated with the instruction cache, the data access time to obtain the cached branch target address is by necessity the same as the access time of the cached instruction bytes. In the case of the relatively large Athlon instruction cache, the access time may be relatively long. A smaller, non-integrated BTAC might have a data access time substantially less than the access time of the integrated instruction cache/BTAC.

The Pentium II/III method does not suffer many of the Athlon integrated instruction cache/BTAC problems mentioned since the Pentium II/III BTB is not integrated with the instruction cache. However, because the Pentium II/III BTB is indexed with the instruction pointer of an already decoded instruction, rather than the instruction cache fetch address, the Pentium II/III solution potentially may not be able to branch as early as the Athlon solution, and therefore, may not reduce the branch penalty as effectively. The Pentium II/III solution potentially addresses this problem by indexing the BTB with the instruction pointer of a previous instruction, or previous instruction group, rather than the actual branch instruction pointer, as mentioned above.

However, a disadvantage of the Pentium II/III method is that some amount of branch prediction accuracy is sacrificed by using the instruction pointer of a previous instruction, rather than the actual branch instruction pointer. The reduction in accuracy is due, in part, because the branch instruction may be reached via multiple instruction paths in the program. That is, instruction pointers of multiple previous instructions to the branch instruction may be cached in the BTB for the same branch instruction. Consequently, multiple entries must be consumed in the BTB for such a branch instruction, thereby reducing the overall number of branch instructions that may be cached in the BTB. The greater the number of instructions previous to the branch instruction used, the greater the number of paths by which the branch instruction may be reached.

Additionally, because using a prior instruction pointer introduces the possibility of multiple paths to the same branch instruction, it potentially takes the Pentium II/III direction predictor in the BTB longer to "warm up". The Pentium II/III BTB maintains branch history information for predicting the direction of the branch. When a new branch instruction is brought into the processor and cached, the multiple paths to the branch instruction potentially cause the branch history to become updated more slowly than would be the case if only a single path to the branch instruction were possible, resulting in less accurate predictions.

Therefore, what is needed is a branch prediction apparatus that makes efficient use of chip real estate, but also provides accurate branching early in the pipeline to reduce branch penalty.

SUMMARY OF THE INVENTION

The present invention provides a branch prediction method and apparatus that makes efficient use of chip real estate, but also provides accurate branching early in the pipeline to reduce branch penalty. Accordingly, in attainment of the aforementioned object, it is a feature of the present invention to provide a microprocessor. The microprocessor includes a branch target address cache (BTAC), configured to cache, for each of a plurality of previously executed branch instructions: a prediction of whether the branch instruction will be taken and is present in a cache line of instruction bytes provided by an instruction cache in response to a fetch address, a target address of the branch instruction, and a location of an opcode byte of the branch instruction within the cache line. The BTAC is further configured to provide the prediction, the target address, and the location in response to the fetch address. The microprocessor also includes an instruction buffer, coupled to receive the cache line from the instruction cache and to mark a byte in the cache line within the instruction buffer indicated by the location provided by the BTAC if the microprocessor branches to the target address provided by the BTAC based on the prediction. The microprocessor also includes an instruction decoder, coupled to the instruction buffer, configured to format the instruction bytes in the cache line into formatted instructions. The microprocessor also includes prediction check logic, coupled to the instruction decoder, configured to indicate the microprocessor erroneously branched to the target address if the instruction decoder indicates the marked byte is in a non-opcode location within one of the formatted instructions.

In another aspect, it is a feature of the present invention to provide a method for correcting a branch instruction misprediction in a microprocessor. The method includes caching in a branch target address cache (BTAC), for each of a plurality of previously executed branch instructions: a prediction of whether the branch instruction will be taken and is present in a cache line of instruction bytes provided by an instruction cache in response to a fetch address, a target address of the branch instruction, and a location of an opcode byte of the branch instruction within the cache line. The method also includes the instruction cache providing the cache line to an instruction buffer in response to the fetch address. The method also includes the BTAC providing the prediction, the target address, and the location in response to the fetch address. The method also includes branching to the target address provided by the BTAC based on the prediction. The method also includes marking a byte in the cache line within the instruction buffer indicated by the location provided by the BTAC. The method also includes an instruction decoder formatting the instruction bytes in the cache line into formatted instructions. The method also includes indicating the microprocessor erroneously branched to the target address, if the instruction decoder indicates the marked byte is in a non-opcode location within one of the formatted instructions.

An advantage of the present invention is that it ensures proper program execution in a processor that employs a speculative BTAC, which has the potential advantages of more efficient use of integrated circuit real estate, improved processor cycle time and/or reduced processor clocks per instruction, and improved likelihood of single-cycle BTAC cache realization.

In another aspect, it is a feature of the present invention to provide an apparatus in a microprocessor for detecting that the microprocessor erroneously speculatively branched to a target address that is provided by a speculative branch target address cache (BTAC). The apparatus includes a storage element that stores an indication of whether the microprocessor speculatively branched to the target address provided by the BTAC based on an instruction cache fetch address without first determining whether a branch instruction is present in a line of instruction bytes in the instruction cache selected by the fetch address. The apparatus also includes instruction decode logic that receives and decodes the instruction bytes in the instruction cache line subsequent to the microprocessor speculatively branching to the target address. The instruction decode logic indicates whether the line includes a branch instruction. The apparatus also includes prediction check logic, coupled to the instruction decode logic, that provides an error signal to branch control logic if the indication indicates the microprocessor speculatively branched to the target address and the instruction decode logic indicates the line does not include a branch instruction.

In another aspect, it is a feature of the present invention to provide a microprocessor for detecting and correcting an erroneous speculative branch. The microprocessor includes an instruction cache that provides a line of instruction bytes selected by a fetch address. The fetch address is provided to the instruction cache on an address bus. The microprocessor also includes a speculative branch target address cache (BTAC), coupled to the address bus, that provides a speculative target address of a previously executed branch instruction in response to the fetch address whether or not the previously executed branch instruction is present in the line. The microprocessor also includes control logic, coupled to the BTAC, that controls a multiplexer to select the speculative target address as the fetch address during a first period. The microprocessor also includes prediction check logic, coupled to the BTAC, that detects that the control logic controlled the multiplexer to select the speculative target address erroneously. The control logic is further configured to control the multiplexer to select a correct address as the fetch address during a second period in response to the prediction check logic detecting the erroneous selection.

In another aspect, it is a feature of the present invention to provide a method for recovering from an erroneous branch to a speculative target address. The method includes generating a speculative target address for a branch instruction that is presumed present in an instruction cache line selected by a fetch address, branching to the speculative target address whether or not the presumed branch instruction is present in the instruction cache line, and generating a correct target address of the presumed branch instruction subsequent to the generating the speculative target address. The method also includes determining if the speculative target address matches the correct target address, and branching to the correct target address if the speculative target address does not match the correct target address.

In another aspect, it is a feature of the present invention to provide a method for recovering from an erroneous branch to a speculative target address for a branch instruction, the branch instruction being presumably present in a line of instructions, the line of instructions being provided by an instruction cache in response to a fetch address, the speculative target address being speculatively generated by a branch target address cache (BTAC) in response to the fetch address. The method includes decoding the presumed branch instruction subsequent to the BTAC speculatively generating the speculative target address, determining if the presumed branch instruction is a non-branch instruction in response to the decoding, and branching to an instruction pointer of the presumed branch instruction if the presumed branch instruction is a non-branch instruction.

In another aspect, it is a feature of the present invention to provide a method for recovering from an erroneous branch to a speculative target address, the speculative target address being associated with a branch instruction that is presumably present in a cache line selected by a fetch address, the speculative target address being provided by a branch target address cache (BTAC) in response to the fetch address. The method includes decoding the presumed branch instruction subsequent to the BTAC providing the speculative target address, determining a length of the presumed branch instruction, and branching to an instruction pointer of the presumed branch instruction if the length of the presumed branch instruction does not match an instruction length speculatively provided by the branch target address cache.

In another aspect, it is a feature of the present invention to provide a method for recovering from an erroneous branch to a speculative target address. The method includes generating a speculative target address of a branch instruction that is presumed present in an instruction cache line selected by a fetch address, generating a speculative direction prediction of the presumed branch instruction, and branching to the speculative target address whether or not the presumed branch instruction is present in the instruction cache line. The method also includes generating a correct direction of the presumed branch instruction subsequent to the generating the speculative direction prediction, determining if the correct direction is not taken, and branching to an instruction pointer of a next instruction after the presumed branch instruction if the correct direction is not taken.

In another aspect, it is a feature of the present invention to provide an apparatus in a microprocessor for detecting an erroneous branch to a speculative return address that is provided by a speculative call/return stack. The apparatus includes a storage element that stores an indication of whether the microprocessor branched to the speculative return address without knowing whether or not an instruction associated with the indication is a branch instruction. The apparatus also includes instruction decode logic that receives and decodes the instruction subsequent to the microprocessor branching to the speculative return address. The apparatus also includes prediction check logic, coupled to the instruction decode logic, that notifies branch control logic that the microprocessor erroneously branched to the speculative return address if the instruction decode logic indicates that the instruction is not a branch instruction and the indication indicates that the microprocessor branched to the speculative return address.

In another aspect, it is a feature of the present invention to provide a microprocessor for detecting and correcting an erroneous speculative branch. The microprocessor includes an instruction cache that provides a line of instruction bytes selected by a fetch address. The microprocessor also includes a speculative call/return stack that provides a speculative return address of a previously executed branch instruction in response to the fetch address. The speculative return address is provided whether or not the previously executed branch instruction is present in the line of instruction bytes. The microprocessor also includes control logic, coupled to the speculative call/return stack, that controls a multiplexer to select the speculative return address to be the fetch address during a first period. The microprocessor also includes prediction check logic, coupled to the control logic, that detects that the control logic controlled the multiplexer to select the speculative return address erroneously. The control logic also controls the multiplexer to select a correct address to be the fetch address during a second period. The control logic selects the correct address in response to the prediction check logic detecting that the control logic controlled the multiplexer to select the speculative return address erroneously.

In another aspect, it is a feature of the present invention to provide a method in a microprocessor for recovering from an erroneous branch to a speculative target address of a presumed branch instruction. The method includes providing a speculative target address in response to an instruction cache fetch address, producing an instruction cache line in response to the instruction cache fetch address, and decoding an instruction from the instruction cache line subsequent to the providing the speculative target address. The decoding is performed for a first time by the microprocessor for the instruction. The method also includes branching to the speculative target address prior to the decoding, and branching to a correct target address of the instruction subsequent to the branching to the speculative target address in response to the decoding.

In another aspect, it is a feature of the present invention to provide a method for recovering from an erroneous branch to a speculative target address. The method includes providing a speculative target address for a branch instruction that is presumed present in an instruction cache line that is selected by a fetch address, branching to the speculative target address whether or not the presumed branch instruction is present in the instruction cache line, and correcting from an erroneous branch if the presumed branch instruction is not present in the instruction cache line.

In another aspect, it is a feature of the present invention to provide a branch apparatus in a microprocessor for detecting when the microprocessor erroneously branches to a speculative target address, the speculative target address being provided by a branch target address cache (BTAC). The apparatus includes a branch hit indicator, provided to indicate when the microprocessor branches to the speculative target address. The branch hit indicator is provided whether or not an instruction associated with the branch hit indicator is a branch instruction. The apparatus also includes instruction decode logic that receives and decodes the instruction and specifies whether the instruction is a branch instruction. The apparatus also includes prediction check logic, coupled to the instruction decode logic, that determines that the microprocessor erroneously branched to the speculative target address. The microprocessor erroneously branched to the speculative target address when the instruction decode logic specifies that the instruction is not a branch instruction, and the branch hit indicator indicates that the microprocessor branched to the speculative target address.

An advantage of the present invention is that it ensures proper program execution in a processor that employs a speculative BTAC, which has the potential advantages of more efficient use of integrated circuit real estate, improved processor cycle time and/or reduced processor clocks per instruction, and improved likelihood of single-cycle BTAC cache realization.

Other features and advantages of the present invention will become apparent upon study of the remaining portions of the specification and drawings.

BRIEF DESCRIPTION OF THE DRAWINGS

FIG. 11 is sample code fragments and a table illustrating an example of the speculative branch misprediction detection and correction of FIG. 10 according to the present invention.

FIG. 12 is a block diagram illustrating an alternate embodiment of the branch prediction apparatus of FIG. 4 including a hybrid speculative branch direction predictor according to the present invention.

DETAILED DESCRIPTION

Figure 3:
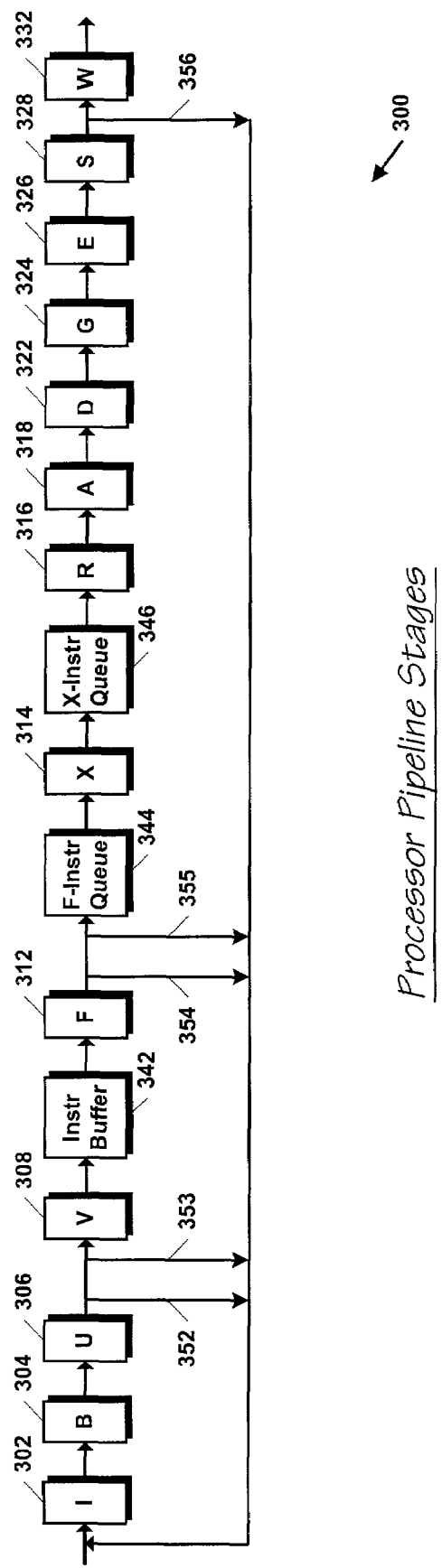
FIG. 3 is a block diagram illustrating a pipelined microprocessor according to the present invention.

Referring now to FIG. 3, a block diagram illustrating a pipelined microprocessor 300 according to the present invention is shown. The processor pipeline 300 includes a plurality of stages 302 through 332.

The first stage is the I-stage 302, or instruction fetch stage. The I-stage 302 is the stage where the processor 300 provides a fetch address to an instruction cache 432 (see FIG. 4) in order to fetch instructions for the processor 300 to execute. The instruction cache 432 is described in more detail with respect to FIG. 4. In one embodiment, the instruction cache 432 is a two-cycle cache. A B-stage 304 is the second stage of the instruction cache 432 access. The instruction cache 432 provides its data to a U-stage 306, where the data is latched in. The U-stage 306 provides the instruction cache data to a V-stage 308.

In the present invention, the processor 300 further comprises a speculative branch target address cache (BTAC) 402 (see FIG. 4), described in detail with respect to the remaining Figures. The BTAC 402 is not integrated with the instruction cache 432. However, the BTAC 402 is accessed in parallel with the instruction cache 432 in the I-stage 302 using the instruction cache 432 fetch address 495 (see FIG. 4), thereby enabling relatively fast branching to reduce branch penalty. The BTAC 402 provides a speculative branch target address 352 that is provided to the I-stage 302. The processor 300 selectively chooses the target address 352 as the instruction cache 432 fetch address to achieve a branch to the speculative target address 352, as described in detail with respect to the remaining Figures.

Advantageously, as may be seen from FIG. 3, the branch target address 352 supplied by the branch target address cache 402 in the U-stage 306 enables the processor 300 to branch relatively early in the pipeline 300, creating only a two-cycle instruction bubble. That is, if the processor 300 branches to the speculative target address 352, only two stages worth of instructions must be flushed. In other words, within two cycles, the target instructions of the branch will be available at the U-stage 306 in the typical case, i.e., if the target instructions are present in the instruction cache 432.

Advantageously, in most cases, the two-cycle bubble is small enough that it may be absorbed by an instruction buffer 342, F-stage instruction queue 344 and/or X-stage instruction queue 346, described below. Consequently, in many cases, the speculative BTAC 402 enables the processor 300 to achieve zero-penalty branches.

Figure 4:
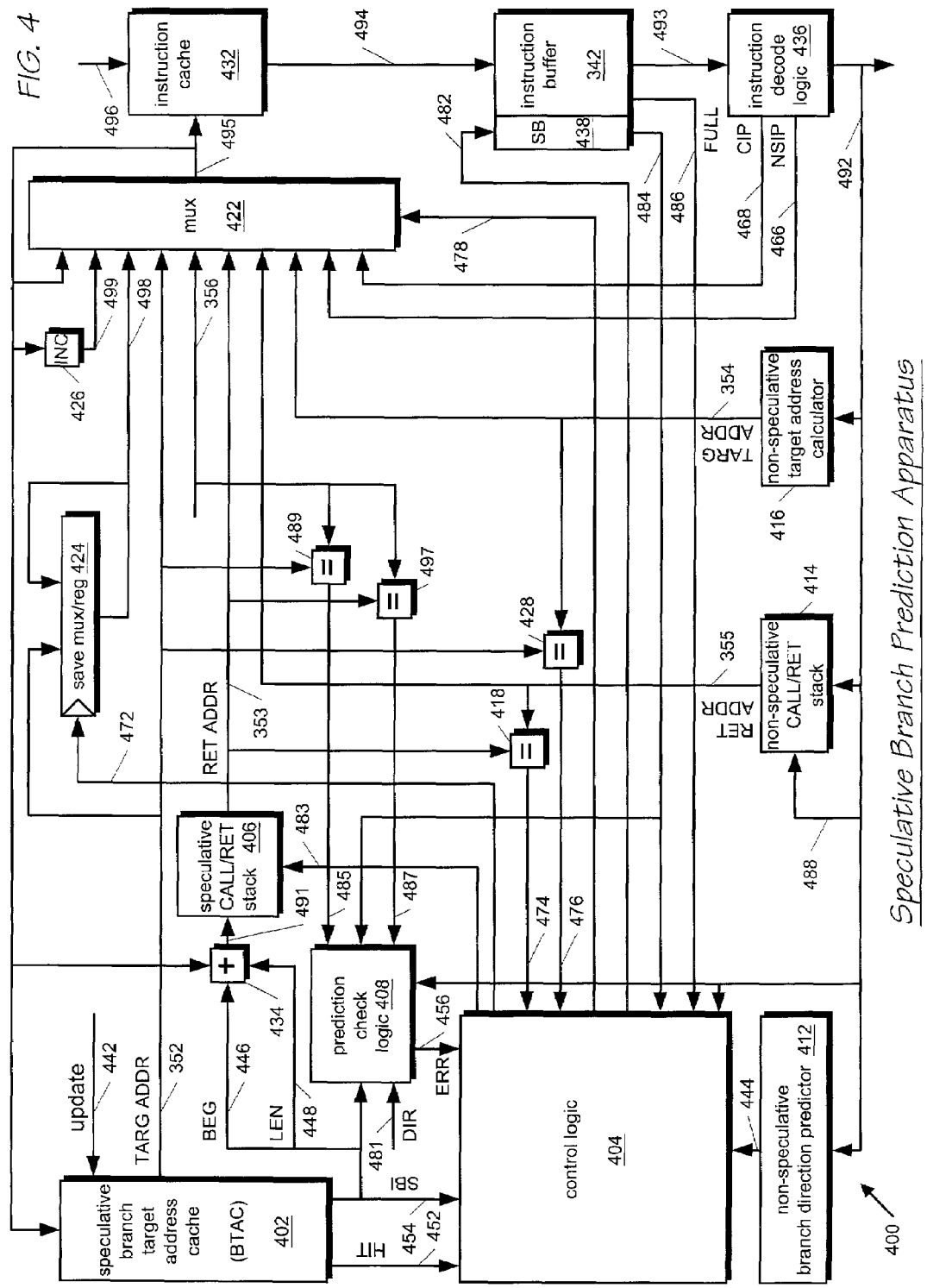
FIG. 4 is a speculative branch prediction apparatus of the processor of FIG. 3 according to the present invention.
Figure 8:
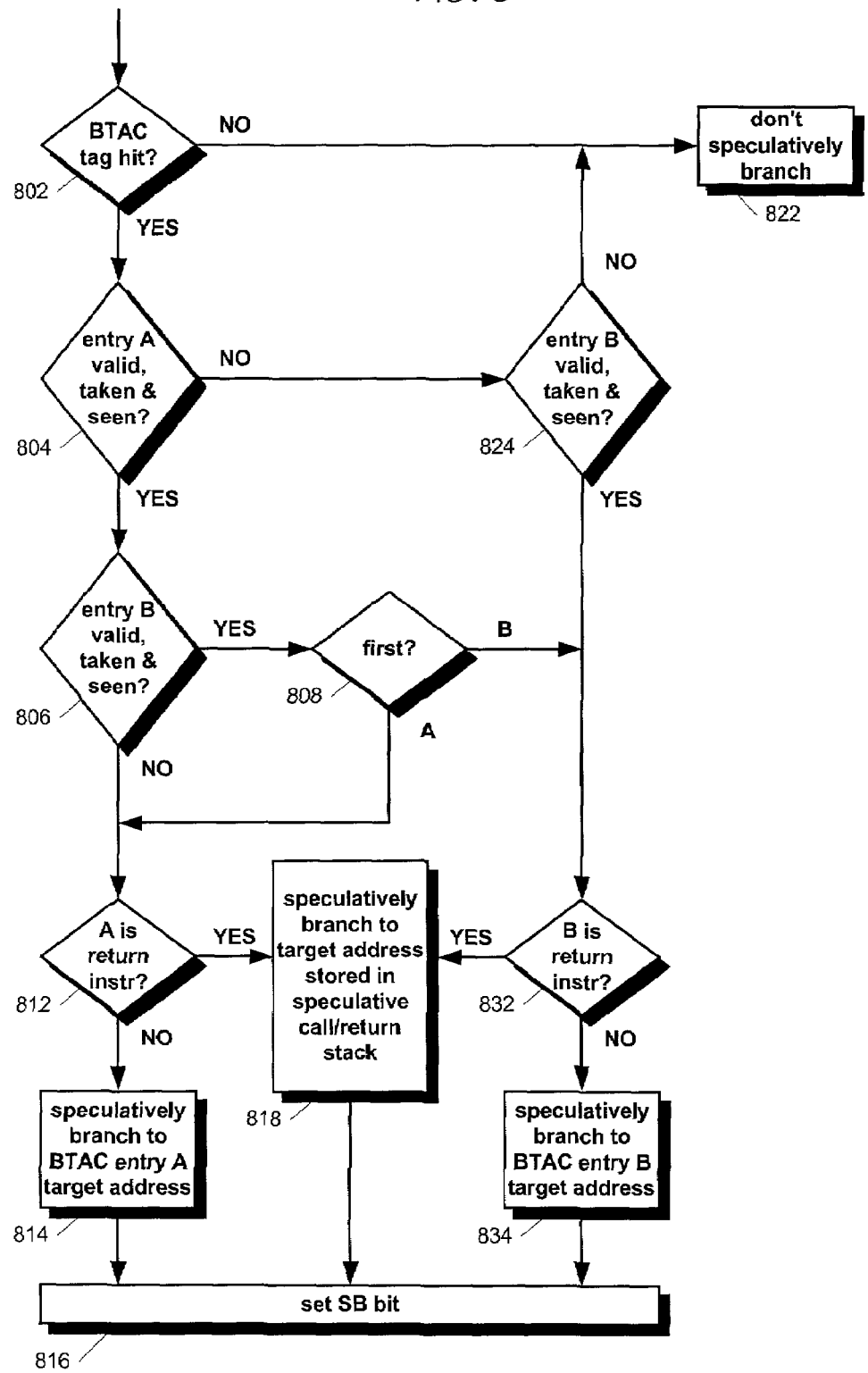
FIG. 8 is a flowchart illustrating operation of the speculative branch prediction apparatus of FIG. 4 according to the present invention.
Figure 13:
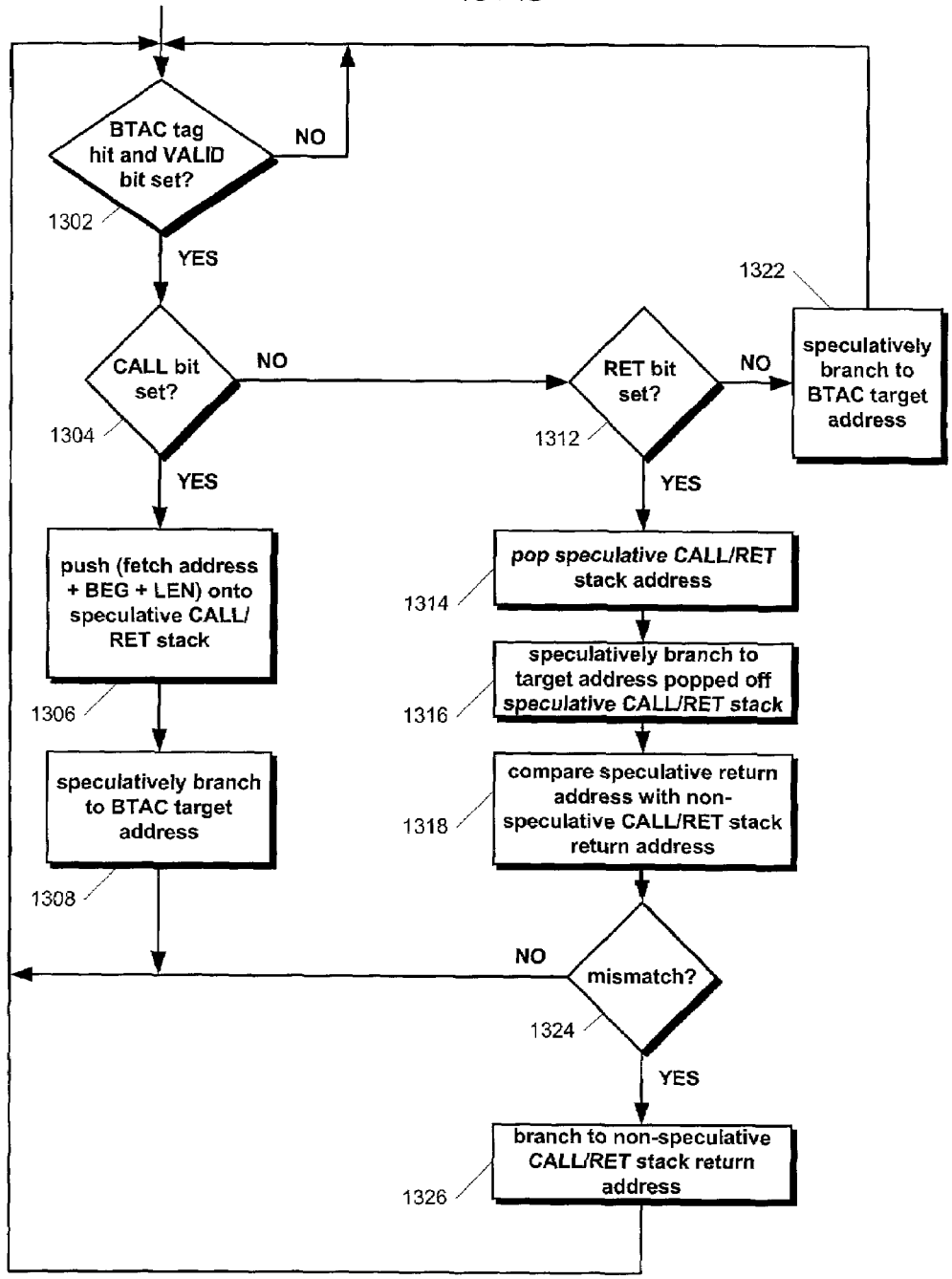
FIG. 13 is a flowchart illustrating operation of the dual call/return stacks of FIG. 4.

The processor 300 further comprises a speculative call/return stack 406 (see FIG. 4), described in detail with respect to FIGS. 4, 8, and 13. The speculative call/return stack 406 works in conjunction with the speculative BTAC 402 to generate a speculative return address 353, i.e., a target address of a return instruction that is provided to the I-stage 302. The processor 300 selectively chooses the speculative return address 353 as the instruction cache 432 fetch address to achieve a branch to the speculative return address 353, as described in detail with respect to FIG. 8.

The V-stage 308 is the stage in which instructions are written to the instruction buffer 342. The instruction buffer 342 buffers instructions for provision to an F-stage 312. The V-stage 308 also includes decode logic for providing information about the instruction bytes to the instruction buffer 342, such as x86 prefix and mod R/M information, and whether an instruction byte is a branch opcode value.

The F-stage 312, or instruction format stage 312, includes instruction format and decode logic 436 (see FIG. 4) for formatting instructions. Preferably, the processor 300 is an x86 processor, which allows for variable length instructions in its instruction set. The instruction format logic 436 receives a stream of instruction bytes from the instruction buffer 342 and parses the stream into discrete groups of bytes constituting an x86 instruction, and in particular providing the length of each instruction.

The F-stage 312 also includes branch instruction target address calculation logic 416 (see FIG. 4) for generating a non-speculative branch target addresses 354 based on an instruction decode, rather than based speculatively on the instruction cache 432 fetch address, like the BTAC 402 in the I-stage 302. The F-stage 312 also includes a call/return stack 414 (see FIG. 4) for generating a non-speculative return addresses 355 based on an instruction decode, rather than based speculatively on the instruction cache 432 fetch address, like the I-stage 302 branch target address cache 402. The F-stage 312 non-speculative addresses 354 and 355 are provided to the I-stage 302. The processor 300 selectively chooses the F-stage 312 non-speculative address 354 or 355 as the instruction cache 432 fetch address to achieve a branch to one of the addresses 354 or 355, as described in detail below.

An F-stage instruction queue 344 receives the formatted instructions. Formatted instructions are provided by the F-stage instruction queue 344 to an instruction translator in the X-stage 314.

The X-stage 314, or translation stage 314, instruction translator translates x86 macroinstructions into microinstructions that are executable by the remainder of the pipeline stages. The translated microinstructions are provided by the X-stage 314 to an X-stage instruction queue 346.

The X-stage instruction queue 346 provides translated microinstructions to an R-stage 316, or register stage 316. The R-stage 316 includes the user-visible x86 register set, in addition to other non-user-visible registers. Instruction operands for the translated microinstructions are stored in the R-stage 316 registers for execution of the microinstructions by subsequent stages of the pipeline 300.

An A-stage 318, or address stage 318, includes address generation logic that receives operands and microinstructions from the R-stage 316 and generates addresses required by the microinstructions, such as memory addresses for load/store microinstructions.

A D-stage 322, or data stage 322, includes logic for accessing data specified by the addresses generated by the A-stage 318. In particular, the D-stage 322 includes a data cache for caching data within the processor 300 from a system memory. In one embodiment, the data cache is a two cycle cache. A G-stage 324 is the second stage of the data cache access, and the data cache data is available in an E-stage 326.

The E-stage 326, or execution stage 326, includes execution logic, such as arithmetic logic units, for executing the microinstructions based on the data and operands provided from previous stages. In particular, the E-stage 326 produces a resolved target address 356 of all branch instructions. That is, the E-stage 326 target address 356 is known to be the correct target address of all branch instructions with which all predicted target addresses must match. In addition, the E-stage 326 produces a resolved direction (DIR) 481 (see FIG. 4) for all branch instructions.

An S-stage 328, or store stage 328, performs a store to memory of the results of the microinstruction execution received from the E-stage 326. In addition, the target address 356 of branch instructions calculated in the E-stage 326 is provided to the instruction cache 432 in the I-stage 302 from the S-stage 328. Furthermore, the BTAC 402 of the I-stage 302 is updated from the S-stage 328 with the resolved target addresses of branch instructions executed by the pipeline 300 for caching in the BTAC 402. In addition, other speculative branch information (SBI) 454 (see FIG. 4) is updated in the BTAC 402 from the S-stage 328. The speculative branch information 454 includes the branch instruction length, the location within an instruction cache 432 line of the branch instruction, whether the branch instruction wraps over multiple instruction cache 432 lines, whether the branch is a call or return instruction, and information used to predict the direction of the branch instruction, as described with respect to FIG. 7.

A W-stage 332, or write-back stage 332, writes back the result from the S-stage 328 into the R-stage 316 registers, thereby updating the processor 300 state.

The instruction buffer 342, F-stage instruction queue 344 and X-stage instruction queue 346, among other things, serve to minimize the impact of branches upon the clocks per instruction value of the processor 300.

Referring now to FIG. 4, a speculative branch prediction apparatus 400 of the processor 300 of FIG. 3 according to the present invention is shown. The processor 300 includes an instruction cache 432 for caching instruction bytes 496 from a system memory. The instruction cache 432 is addressed with a fetch address 495 provided on a fetch address bus for indexing a line within the instruction cache 432. Preferably, the fetch address 495 comprises a 32-bit virtual address. That is, the fetch address 495 is not a physical memory address of an instruction. In one embodiment, the virtual fetch address 495 is an x86 linear instruction pointer. In one embodiment, the instruction cache 432 is 32-bytes wide; hence, only the upper 27 bits of the fetch address 495 are used to index the instruction cache 432. A selected cache line 494 of instruction bytes is provided on an output of the instruction cache 432. The instruction cache 432 is described in more detail with respect to FIG. 5 presently.

Figure 5:
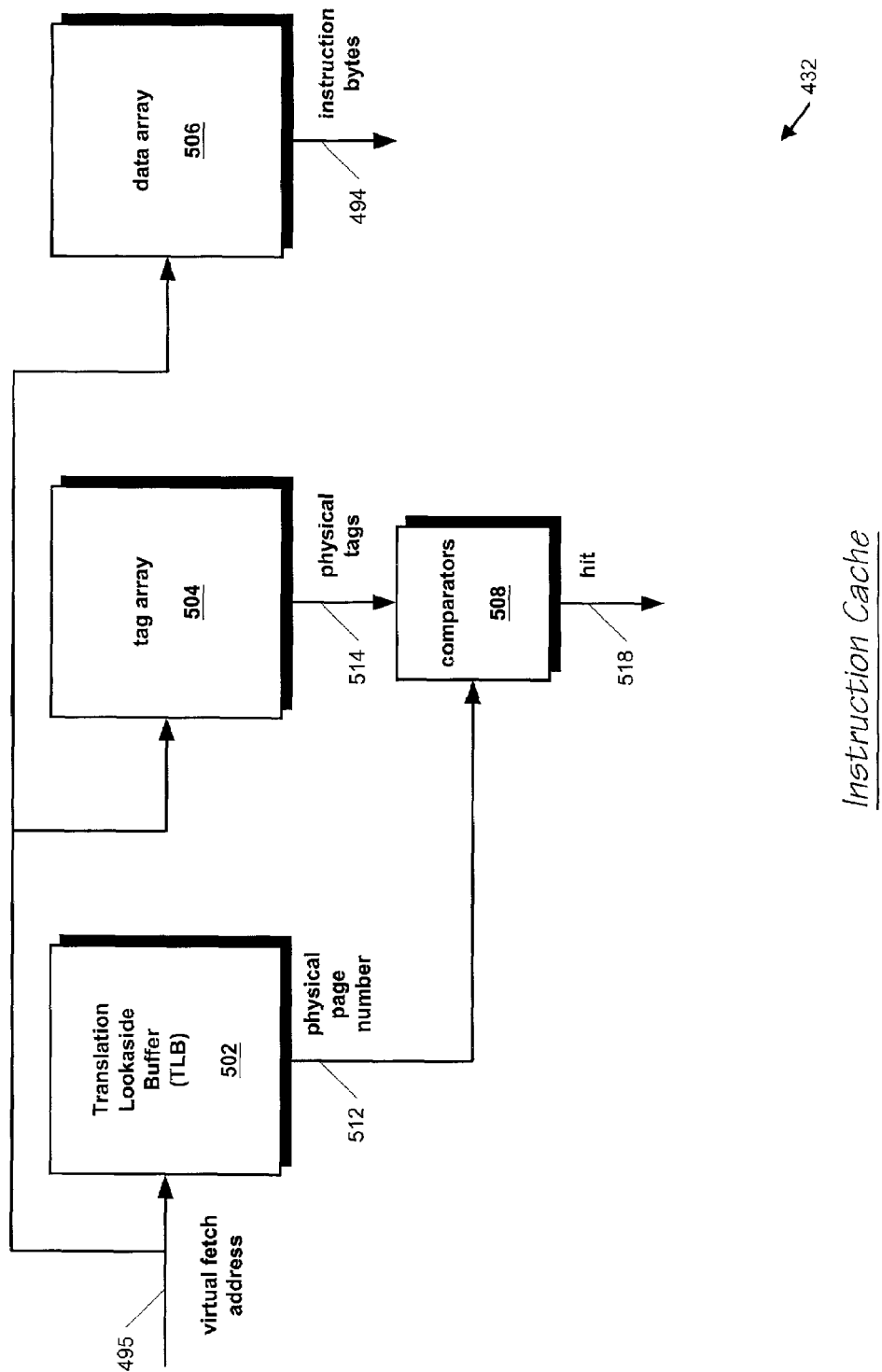
FIG. 5 is a block diagram of the instruction cache of FIG. 4.

Referring now to FIG. 5, a block diagram of one embodiment of the instruction cache 432 of FIG. 4 is shown. The instruction cache 432 includes logic (not shown) for translating the virtual fetch address 495 of FIG. 4 to a physical address. The instruction cache 432 includes a translation lookaside buffer (TLB) 502 for caching physical addresses previously translated from virtual fetch addresses 495 by the translation logic. In one embodiment, the TLB 502 receives bits [31:12] of the virtual fetch address 495 and provides on its output a corresponding 20-bit physical page number 512 when the virtual fetch address 495 hits in the TLB 502.

The instruction cache 432 includes a data array 506 for caching instruction bytes. The data array 506 is arranged as a plurality of lines indexed by a portion of the virtual fetch address 495. In one embodiment, the data array 506 stores 64KB of instruction bytes arranged in 32 byte lines. In one embodiment, the data instruction cache 432 is a 4-way set associative cache. Hence, the data array 506 comprises 512 lines of instruction bytes indexed by bits [13:5] of the fetch address 495.

The line of instruction bytes 494 selected by the virtual fetch address 495 is provided on the output of the instruction cache 432 to the instruction buffer 342 as shown in FIG. 4. In one embodiment, one half of the selected line of instruction bytes is provided to the instruction buffer 342 at a time, i.e., 16 bytes are provided during two separate periods each. In the present specification, a cache line or line of instruction bytes may be used to refer to a portion of a line selected within the instruction cache 432 by the fetch address 495, such as a half-cache line or other subdivision thereof.

The instruction cache 432 also includes a tag array 504 for caching tags. The tag array 504, like the data array 506, is indexed by the same bits of the virtual fetch address 495. Physical address bits are cached in the tag array 504 as physical tags. The physical tags 514 selected by the fetch address 495 bits are provided on the output of the tag array 504.

The instruction cache 432 also includes a comparator 508 that compares the physical tags 514 with the physical page number 512 provided by the TLB 502 to generate a hit signal 518 for indicating whether the virtual fetch address 495 hit in the instruction cache 432. That is, the hit signal 518 indicates whether the instructions of the task currently being executed by the processor 300 at the fetch address 495 are cached in the data array 506 of the instruction cache 432. The hit signal 518 is a true indication of whether the current task instructions are cached since the instruction cache 432 converts the virtual fetch address 495 to a physical address and uses the physical address to determine a cache hit.

The operation of the instruction cache 432 as just described is in contrast to the BTAC 402 operation, which determines a hit based only on a virtual address, i.e., the fetch address 495, not on a physical address. A consequence of the distinction in operation is that virtual aliasing may occur such that the BTAC 402 produces an erroneous target address 352, as described below.

Referring again to FIG. 4, the instruction buffer 342 of FIG. 3 receives the cache line instruction bytes 494 from the instruction cache 432 and buffers the instruction bytes 494 until they are formatted and translated. As mentioned above with respect to the V-stage 308 of FIG. 3, the instruction buffer 342 also stores other information relevant to branch prediction, such as x86 prefix and mod R/M information, and whether an instruction byte is a branch opcode value.

In addition, the instruction buffer 342 stores a speculatively branched (SB) bit 438 for each instruction byte stored in the instruction buffer 342. If the processor 300 speculatively branches to a speculative target address 352 provided by the BTAC 402 or to a speculative return address 353 provided by the speculative call/return stack 406 based on SBI 454 cached in the BTAC 402, the SB bit 438 is set for an instruction byte indicated by the SBI 454. That is, if the processor 300 speculatively branches based on a presumption that a branch instruction for which SBI 454 is cached in the BTAC 402 is present in the line of instruction bytes 494 provided by the instruction cache 432, the SB bit 438 is set for one of the instruction bytes 494 stored in the instruction buffer 342. In one embodiment, the SB bit 438 is set for the opcode byte of the presumed branch instruction as indicated by the SBI 454.

Instruction decode logic 436 receives instruction bytes 493 from the instruction buffer 342 in order to decode the instruction bytes 493, including branch instruction bytes, to generate instruction decode information 492. The instruction decode information 492 is used to make branch instruction predictions and to detect and correct erroneous speculative branches. The instruction decode logic 436 provides the instruction decode information 492 to downstream portions of the pipeline 300. In addition, the instruction decode logic 436 generates a next sequential instruction pointer (NSIP) 466 and a current instruction pointer (CIP) 468 when decoding the current instruction. In addition, the instruction decode logic 436 provides instruction decode information 492 to the non-speculative target address calculator 416, the non-speculative call/return stack 414, and the non-speculative branch direction predictor 412. Preferably, the non-speculative call/return stack 414, the non-speculative branch direction predictor 412, and the non-speculative target address calculator 416 reside in the F-stage 312 of the pipeline 300.

The non-speculative branch direction predictor 412 generates a non-speculative prediction of the direction of a branch instruction 444, i.e., whether the branch will be taken or not taken, in response to the instruction decode information 492 received from the instruction decode logic 436. Preferably, the non-speculative branch direction predictor 412 includes one or more branch history tables for storing a history of resolved directions of executed branch instructions. Preferably, the branch history tables are used in conjunction with decode information of the branch instruction itself provided by the instruction decode logic 436 to predict a direction of conditional branch instructions. An exemplary embodiment of the non-speculative branch direction predictor 412 is described in U.S. patent application Ser. No. 09/434,984 HYBRID BRANCH PREDICTOR WITH IMPROVED SELECTOR TABLE UPDATE MECHANISM, having a common assignee and which is hereby incorporated by reference. Logic that ultimately resolves the direction of the branch instruction preferably resides in the E-stage 326 of the pipeline 300.

The non-speculative call/return stack 414 generates the non-speculative return address 355 of FIG. 3 in response to the instruction decode information 492 received from the instruction decode logic 436. Among other things, the instruction decode information 492 indicates whether the currently decoded instruction is a call instruction, a return instruction, or neither.

In addition, the instruction decode information 492 includes a return address 488 if the instruction currently being decoded by the instruction decode logic 436 is a call instruction. Preferably, the return address 488 comprises the value of the instruction pointer of the currently decoded call instruction plus the length of the call instruction. The return address 488 is pushed onto the non-speculative call/return stack 414 when the instruction decode information 492 indicates the instruction is a call instruction so that the return address 488 can be provided as non-speculative return address 355 upon subsequent decode of a return instruction by the instruction decode logic 436.

An exemplary embodiment of the non-speculative call/return stack 414 is described in U.S. patent application Ser. No. 09/271,591 METHOD AND APPARATUS FOR CORRECTING AN INTERNAL CALL/RETURN STACK IN A MICROPROCESSOR THAT SPECULATIVELY EXECUTES CALL AND RETURN INSTRUCTIONS, having a common assignee and which is hereby incorporated by reference.

The non-speculative target address calculator 416 generates the non-speculative target address 354 of FIG. 3 in response to the instruction decode information 492 received from the instruction decode logic 436. Preferably, the non-speculative target address calculator 416 includes an arithmetic logic unit for calculating a branch target address of PC-relative or direct type branch instructions. Preferably, the arithmetic logic unit adds an instruction pointer and length of the branch instruction to a signed offset comprised in the branch instruction to calculate the target address of PC-relative type branch instructions. Preferably, the non-speculative target address calculator 416 includes a relatively small branch target buffer (BTB) for caching branch target addresses of indirect type branch instructions. An exemplary embodiment of the non-speculative target address calculator 416 is described in U.S. patent application Ser. No. 09/438,907 APPARATUS FOR PERFORMING BRANCH TARGET ADDRESS CALCULATION BASED ON BRANCH TYPE, having a common assignee and which is hereby incorporated by reference.

The branch prediction apparatus 400 includes the speculative branch target address cache (BTAC) 402. The BTAC 402 is addressed with a fetch address 495 provided on the fetch address bus for indexing a line within the BTAC 402. The BTAC 402 is not integrated with the instruction cache 432, but rather, is separate and distinct from the instruction cache 432, as shown. That is, the BTAC 402 is distinct from the instruction cache 432, both physically and conceptually. The BTAC 402 is physically distinct from the instruction cache 432 in that it is spatially located in a different location within the processor 300 than the instruction cache 432. The BTAC 402 and instruction cache 432 are conceptually distinct in that they are different in size, i.e., in one embodiment they comprise a different number of cache lines. The BTAC 402 and instruction cache 432 are also conceptually distinct in that the instruction cache 432 converts the fetch address 495 to a physical address for determining a hit of a line of instruction bytes; whereas, the BTAC 402 is indexed by the virtual fetch address 495 as a virtual address, without converting to a physical address.

Preferably, the BTAC 402 resides in the I-stage 302 of the pipeline 300. The BTAC 402 caches target addresses of previously executed branch instructions. When the processor 300 executes a branch instruction, the resolved target address of the branch instruction is cached in the BTAC 402 via update signals 442. The instruction pointer (IP) 1512 (see FIG. 15) of the branch instruction is used to update the BTAC 402, as described below with respect to FIG. 15.

To generate the cached branch target address 352 of FIG. 3, the BTAC 402 is indexed by the instruction cache 432 fetch address 495 in parallel with the instruction cache 432. The BTAC 402 provides the speculative branch target address 352 in response to the fetch address 495. Preferably, all 32-bits of the fetch address 495 are used to select the speculative target address 352 from the BTAC 402, as will be described in more detail below, primarily with respect to FIGS. 6 through 9. The speculative branch target address 352 is provided to address selection logic 422 comprising a multiplexer 422.

The multiplexer 422 selects the fetch address 495 from among a plurality of addresses, including the BTAC 402 target address 352, as will be discussed below. The multiplexer 422 output provides the fetch address 495 to the instruction cache 432 and BTAC 402. If the multiplexer 422 selects the BTAC 402 target address 352, then the processor 300 will branch to the BTAC 402 target address 352. That is, the processor 300 will begin fetching instructions from the instruction cache 432 at the BTAC 402 target address 352.

In one embodiment, the BTAC 402 is smaller than the instruction cache 432. In particular, the BTAC 402 caches target addresses for a smaller number of cache lines than are comprised in the instruction cache 432. A consequence of the BTAC 402 not being integrated with the instruction cache 432, yet using the instruction cache 432 fetch address 495 as an index, is that if the processor 300 branches to the target address 352 generated by the BTAC 402 it does so speculatively. The branch is speculative because there is no certainty that a branch instruction resides in the selected instruction cache 432 line at all, much less that the branch instruction for which the target address 352 was cached. A hit in the BTAC 402 only indicates that a branch instruction was previously present in the instruction cache 432 line selected by the fetch address 495. There are at least two reasons there is no certainty a branch instruction is present in the selected cache line.

A first reason there is no certainty that a branch instruction is in the instruction cache 432 line indexed by the fetch address 495 is because the fetch address 495 is a virtual address; therefore, virtual aliasing may occur. That is, two different physical addresses may alias to the same virtual fetch address 495. A given fetch address 495, which is virtual, may translate to two different physical addresses associated with two different processes or tasks of a multi-tasking processor such as processor 300. The instruction cache 432 performs virtual to physical translation using the translation lookaside buffer 502 of FIG. 5 in order to provide the correct instruction data. However, the BTAC 402 performs its lookup based on the virtual fetch address 495 without performing virtual to physical address translation. Avoiding virtual to physical address translation by the BTAC 402 is advantageous because it enables the speculative branch to be performed faster than if virtual to physical address translation was performed.

The operating system performing a task switch provides an example of a situation in which the virtual aliasing condition may occur. After the task switch, the processor 300 will fetch instructions from the instruction cache 432 at a virtual fetch address 495 associated with the new process equal to a virtual fetch address 495 of the old process that includes a branch instruction whose target address 352 is cached in the BTAC 402. The instruction cache 432 will produce the instructions for the new process based on the physical address translated from the virtual fetch address 495, as described above with respect to FIG. 5; however, the BTAC 402 will generate a target address 352 for the old process using only the virtual fetch address 495, thereby causing an erroneous branch. Advantageously, the erroneous speculative branch will only occur the first time the new process instruction is executed because the BTAC 402 target address 352 will be invalidated after the error is discovered, as will be described below with respect to FIG. 10.

Figure 1:
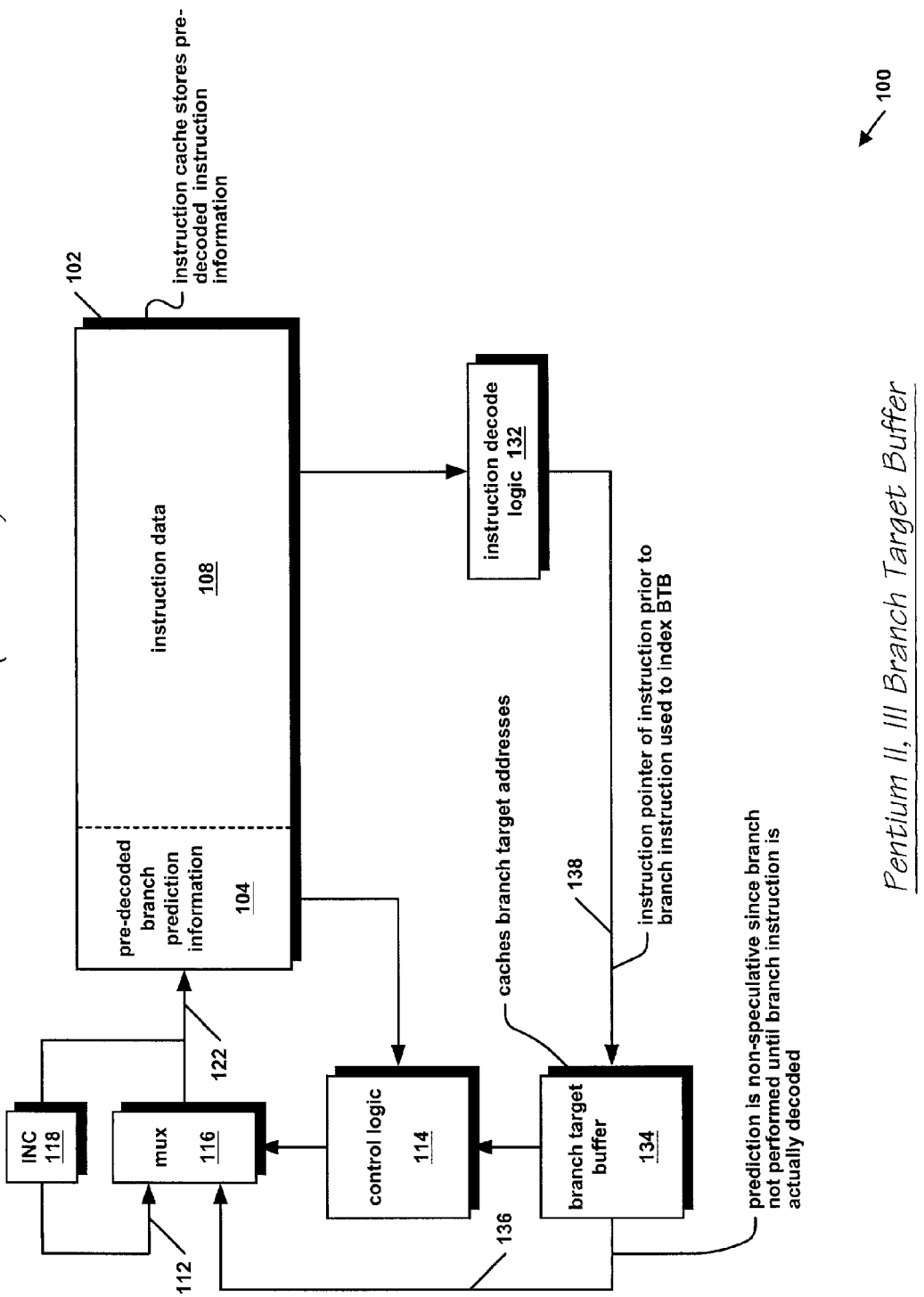
FIG. 1 is a prior art block diagram of relevant portions of a Pentium II/III processor.
Figure 2:
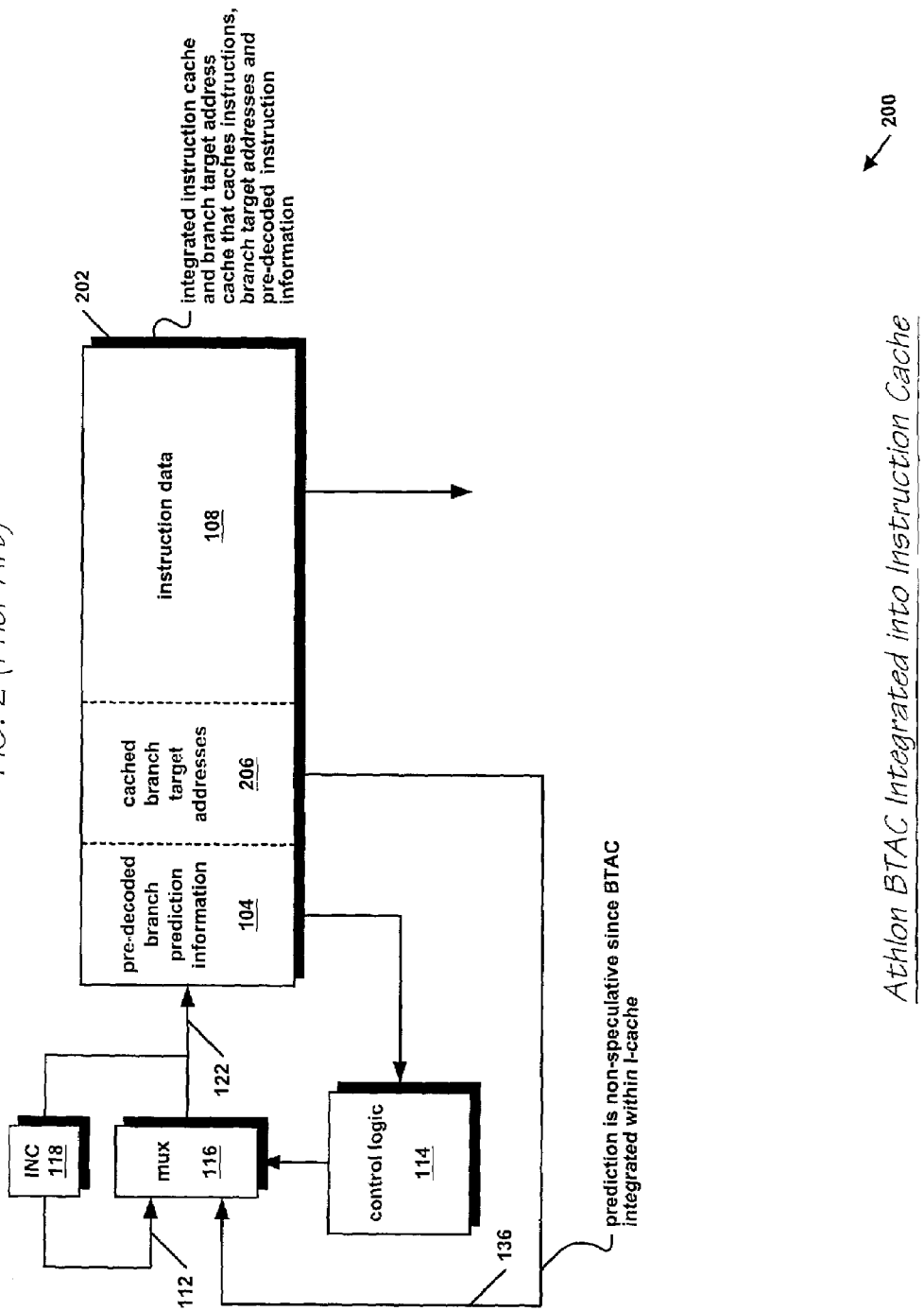
FIG. 2 is a prior art block diagram of relevant portions of an Athlon processor.

Thus, a branch to the BTAC 402 target address 352 is speculative because in some situations the processor 300 will branch to an incorrect target address 352 generated by the BTAC 402 because a branch instruction is not present in the instruction cache 432 at the fetch address 495, due to virtual aliasing, for example. In contrast, the Athlon integrated BTAC/instruction cache 202 of FIG. 2 and the Pentium II/III branch target buffer 134 of FIG. 1 described above are non-speculative in this respect. In particular, the Athlon method is non-speculative since it is presumed virtual aliasing does not occur because the Athlon stores the target address 206 of FIG. 2 alongside the branch instruction bytes 108 themselves. That is, the Athlon BTAC 202 lookup is performed based on a physical address. The Pentium II/III method is non-speculative since the branch target buffer 134 generates a branch target address 136 only after the branch instruction has been fetched from the instruction cache 102 and the instruction decode logic 132 determines that a branch instruction is actually present.

In addition, the non-speculative target address calculator 416, non-speculative call/return stack 414, and non-speculative branch direction predictor 412 predictions are also non-speculative because they generate branch predictions only after the branch instruction has been fetched from the instruction cache 432 and has been decoded by the instruction decode logic 436, as will be described below.

It should be understood that although the direction prediction 444 generated by the non-speculative branch direction predictor 412 is "non-speculative," i.e., made with the certainty that a branch instruction exists in the current instruction stream because the branch instruction has been decoded by the instruction decode logic 436, the non-speculative direction prediction 444 is a "prediction" nevertheless. That is, if the branch instruction is a conditional branch instruction, such as an x86 JCC instruction, the branch may or may not be taken in any given execution of the branch instruction.

Similarly, the target address 354 generated by the non-speculative target address calculator 416 and the return address 355 generated by the non-speculative call/return stack 414 are non-speculative since they are generated with the certainty that a branch instruction exists in the current instruction stream; but they are still predictions, nevertheless. For example, in the case of an x86 indirect jump through memory, the memory contents may have changed since the last time the indirect jump was executed. Hence, the target address may have changed accordingly. Thus, "non-speculative" in this context is not to be confused with "unconditional" as to branch direction or "certain" as to target address. Similarly, "speculative" in this context is not to be confused with "prediction" or "non-certain" as to branch direction or target address.

A second reason there is no certainty that the branch instruction is in the instruction cache 432 line indexed by the fetch address 495 is the existence of self-modifying code. Self-modifying code may change the contents of the instruction cache 432, but the change is not reflected in the BTAC 402. Hence, a BTAC 402 hit may occur for a line of the instruction cache 432 that previously included a branch instruction, but which has been modified or replaced by a different instruction.

The branch prediction apparatus 400 also includes the speculative call/return stack 406. The speculative call/return stack 406 stores speculative target addresses for return instructions. The speculative call/return stack 406 generates the speculative return address 353 of FIG. 3 in response to control signals 483 generated by control logic 404. The speculative return address 353 is supplied to an input of the multiplexer 422. When the multiplexer 422 selects the speculative return address 353 generated by the speculative call/return stack 406, the processor 300 branches to the speculative return address 353.

The control logic 404 generates control signals 483 to control the speculative call/return stack 406 to provide the speculative return address 353 when the BTAC 402 indicates a return instruction may be present in a line of the instruction cache 432 specified by the fetch address 495. Preferably, the BTAC 402 indicates a return instruction may be present in a line of the instruction cache 432 specified by the fetch address 495 when the selected BTAC 402 entry 602 VALID 702 and RET 706 bits (see FIG. 7) are set and a BTAC 402 HIT signal 452 indicates a hit in the BTAC 402 tag array 614 (see FIG. 6).

The BTAC 402 generates the HIT signal 452 and speculative branch information (SBI) 454 in response to the fetch address 495. The HIT signal 452 indicates that the fetch address 495 generated a cache tag hit in the BTAC 402, described below with respect to FIG. 6. The SBI 454 is also described more thoroughly below with respect to FIG. 6.

The SBI 454 includes a BEG 446 signal (branch instruction beginning byte offset within a line in the instruction cache 432) and a LEN 448 signal (branch instruction length). The BEG 446 value, the LEN 448 value and the fetch address 495 are added together by an adder 434 to generate a return address 491. The return address 491 is provided on the adder 434 output to the speculative call/return stack 406 so that the return address 491 can be pushed onto the speculative call/return stack 406. The control logic 404 operates the speculative call/return stack 406 in conjunction with the BTAC 402 via signals 483 to push the return address 491. The return address 491 is pushed only if the selected BTAC 402 entry 602 VALID 702 and CALL 704 bits (see FIG. 7) are set and the HIT signal 452 indicates a hit in the BTAC 402 tag array 614 (see FIG. 6) Operation of the speculative call/return stack 406 will be described in more detail below with respect to FIGS. 8 and 13.

The branch prediction apparatus 400 also includes the control logic 404. The control logic 404 controls multiplexer 422 via control signals 478 to select one of the plurality of address inputs to be the fetch address 495. The control logic 404 also sets the SB bits 438 in the instruction buffer 342 via signal 482.

The control logic 404 receives the HIT signal 452, the SBI 454, the non-speculative branch direction prediction 444 from the non-speculative branch direction predictor 412, and a FULL signal 486 from the instruction buffer 342.

The branch prediction apparatus 400 also includes prediction check logic 408. The prediction check logic 408 generates an ERR signal 456, which is provided to the control logic 404 to indicate that an erroneous speculative branch was performed based on a BTAC 402 hit, as described below with respect to FIG. 10. The prediction check logic 408 receives the SB bits 438 from the instruction buffer 342 via signal 484, which is also provided to the control logic 404. The prediction check logic 408 also receives the SBI 454 from the BTAC 402. The prediction check logic 408 also receives instruction decode information 492 from the instruction decode logic 436. The prediction check logic 408 also receives the resolved branch direction DIR 481 produced by the E-stage 326 of FIG. 3.

The prediction check logic 408 also receives the output 485 of a comparator 489. The comparator 489 compares the speculative target address 352 generated by the BTAC 402 and the resolved target address 356 of FIG. 3 produced by the E-stage 326. The BTAC 402 speculative target address 352 is registered and piped down the instruction pipeline 300 to the comparator 489.

The prediction check logic 408 also receives the output 487 of a comparator 497. The comparator 497 compares the speculative return address 353 generated by the speculative call/return stack 406 and the resolved target address 356. The speculative return address 353 is registered and piped down the instruction pipeline 300 to the comparator 497.

The BTAC 402 speculative target address 352 is also registered and piped down the instruction pipeline 300 for comparison with the non-speculative target address calculator 416 target address 354 by a comparator 428. The comparator 428 output 476 is provided to the control logic 404. Similarly, the speculative return address 353 generated by the speculative call/return stack 406 is also registered and piped down the instruction pipeline 300 for comparison with the non-speculative return address 355 by a comparator 418. The comparator 418 output 474 is also provided to the control logic 404.

The branch prediction apparatus 400 also includes a save multiplexed/register 424. The save mux/reg 424 is controlled by a control signal 472 generated by the control logic 404. The output 498 of the save mux/reg 424 is provided as an input to the multiplexer 422. The save mux/reg 424 receives as inputs its own output 498 and the BTAC 402 speculative target address 352.

The multiplexer 422 also receives as an input the S-stage 328 branch address 356. The multiplexer 422 also receives as an input the fetch address 495 itself. The multiplexer 422 also receives as an input a next sequential fetch address 499 generated by an incrementer 426, that receives the fetch address 495 and increments it to the next sequential instruction cache 432 line.

Figure 6:
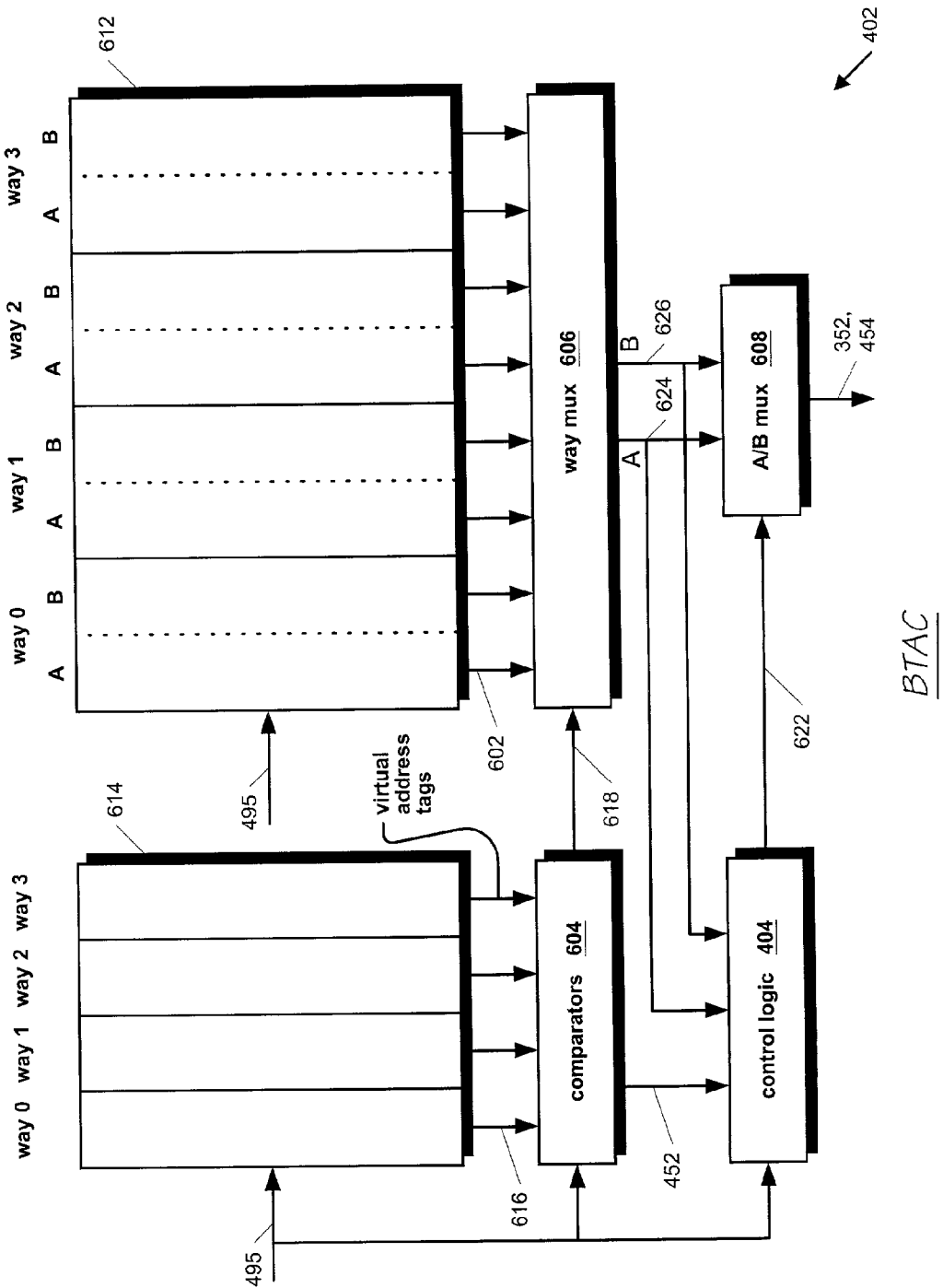
FIG. 6 is a block diagram of the branch target address cache (BTAC) of FIG. 4 according to the present invention.

Referring now to FIG. 6, a block diagram of the BTAC 402 of FIG. 4 according to the present invention is shown. In the embodiment shown in FIG. 6, the BTAC 402 comprises a 4-way set-associative cache. The BTAC 402 comprises a data array 612 and a tag array 614. The data array 612 comprises an array of storage elements for storing entries for caching branch target addresses and speculative branch information. The tag array 614 comprises an array of storage elements for storing address tags.

Each of the data array 612 and tag array 614 is organized into four ways, shown as way 0, way 1, way 2, and way 3. Preferably, each of the data array 612 ways stores two entries for caching a branch target address and speculative branch information, designated A and B. Hence, the data array 612 generates eight entries 602 each time it is read. The eight entries 602 are provided to an 8:2 way select mux 606.

Each of the data array 612 and tag array 614 is indexed by the instruction cache 432 fetch address 495 of FIG. 4. The lower significant bits of the fetch address 495 select a line within each of the arrays 612 and 614. In one embodiment, each of the arrays comprises 128 lines. Hence, the BTAC 402 is capable of caching up to 1024 target addresses, 2 for each of the 4 ways for each of the 128 lines. Preferably, the arrays 612 and 614 are indexed with bits [11:5] of the fetch address 495.

The tag array 614 generates a tag 616 for each way. Preferably, each tag 616 comprises 20 bits of virtual address, and each of the four tags 616 is compared with bits [31:12] of the fetch address 495 by a block of comparators 604. The comparators 604 generate the HIT signal 452 of FIG. 4 to indicate whether a hit of the BTAC 402 has occurred based on whether one of the tags 616 matches the most significant bits of the fetch address 495. The HIT signal 452 is provided to the control logic 404 of FIG. 4.

In addition, the comparators 604 generate control signals 618 to control the way select mux 606. In response, the way select mux 606 selects the A and B entry, 624 and 626, respectively, of one of the four ways in the line generated by the BTAC 402. The A entry 624 and B entry 626 are provided to an A/B select mux 608 and to the control logic 404. The control logic 404 generates a control signal 622 to control the A/B select mux 608 in response to the HIT 452 signal, entry A 624 and entry B 626, the fetch address 495 and other control signals. In response, the A/B select mux 608 selects one of entry A 624 or entry B 626 as the BTAC 402 target address 352 of FIG. 3 and SBI 454 of FIG. 4.

Preferably, the BTAC 402 is a single-ported cache. A single-ported cache has the advantage of being smaller, and therefore able to cache more target addresses than a dual-ported cache in the same amount of space. However, a dual-ported cache is contemplated to facilitate simultaneous reads and writes of the BTAC 402. The simultaneous read and write feature of the dual-ported BTAC 402 enables faster updates of the BTAC 402 since the updating writes do not have to wait for reads. The faster updates generally result in a more accurate prediction, since the information in the BTAC 402 is more current.

In one embodiment, the instruction cache 432 lines comprise 32 bytes each. However, the instruction cache 432 provides a half-cache line of instruction bytes 494 at time. In one embodiment, each line of the BTAC 402 stores two entries 602, and therefore two target addresses 714, per half-cache line of the instruction cache 432.

Figure 7:
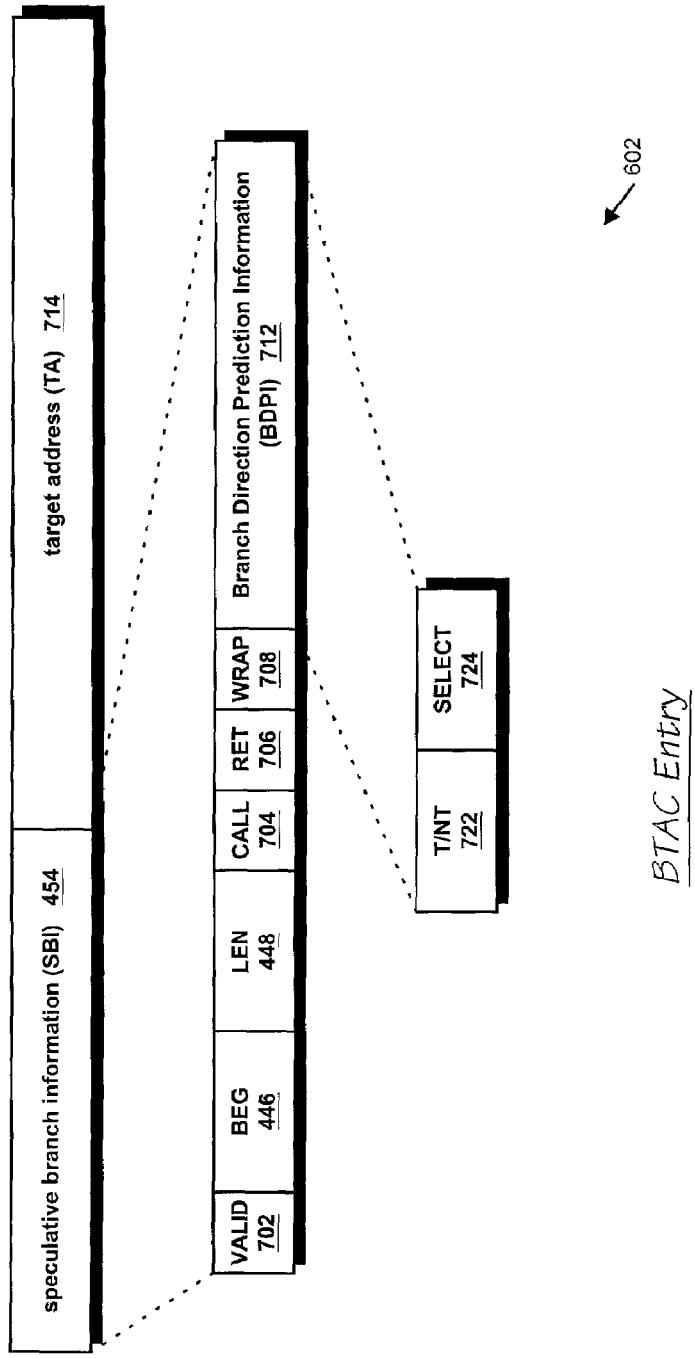
FIG. 7 is a block diagram of the format of an entry of FIG. 6 of the BTAC of FIG. 4 according to the present invention.

Referring now to FIG. 7, a block diagram of the format of an entry 602 of FIG. 6 of the BTAC 402 of FIG. 4 according to the present invention is shown. The entry 602 comprises the SBI (speculative branch information) 454 of FIG. 4 and a branch target address (TA) 714. The SBI 454 comprises a VALID bit 702, the BEG 446 and LEN 448 of FIG. 4, a CALL bit 704, a RET bit 706, a WRAP bit 708, and branch direction prediction information (BDPI) 712. After the pipeline 300 of FIG. 3 executes a branch, the resolved target address of the branch is cached in the TA field 714, and the SBI 454 obtained from decoding and executing the branch instruction is cached in the SBI 454 field of an entry 602 of the BTAC 402.

The VALID bit 702 indicates whether the entry 602 may be used for speculatively branching the processor 300 to the associated target address 714. In particular, the VALID bit 702 is initially cleared because the BTAC 402 is empty since no valid target addresses have been cached. The VALID bit 702 is set when the processor 300 executes a branch instruction and the resolved target address and speculative branch information associated with the branch instruction is cached in the entry 602. Subsequently, the VALID bit 702 is cleared if the BTAC 402 makes an erroneous prediction based on the entry 602, as described below with respect to FIG. 10.

The BEG field 446 specifies the branch instruction beginning byte offset within a line in the instruction cache 432.

The BEG field 446 is used to calculate a return address for storage in the speculative call/return stack 406 of FIG. 4 upon detection of a call instruction hitting in the BTAC 402. Additionally, the BEG field 446 is used to determine which if either of the entry A 624 or entry B 626 of FIG. 6 of a selected BTAC 402 way should result in a BTAC 402 hit, as will be described below with respect to FIG. 8. Preferably, the branch instruction locations specified by entry A 624 and entry B 626 need not be in any particular location order within the instruction cache 432 line. That is, the entry B 626 branch instruction may be earlier in the instruction cache 432 line than the entry A 624 branch instruction.

The LEN 448 field specifies the length in bytes of the branch instruction. The LEN field 448 is used to calculate a return address for storage in the speculative call/return stack 406 of FIG. 4 upon detection of a call instruction hitting in the BTAC 402.

The CALL bit 704 indicates whether the cached target address 714 is associated with a call instruction. That is, if a call instruction was executed by the processor 300 and the target address of the call instruction was cached in the entry 602, then the CALL bit 704 will be set.

The RET bit 706 indicates whether the cached target address 714 is associated with a return instruction. That is, if a return instruction was executed by the processor 300 and the target address of the return instruction was cached in the entry 602, then the RET bit 706 will be set.

The WRAP bit 708 is set if the branch instruction bytes span two instruction cache 432 lines. In one embodiment, the WRAP bit 708 is set if the branch instruction bytes span two instruction cache 432 helf-lines The BDPI (branch direction prediction information) field 712 comprises a T/NT (taken/not taken) field 722 and a SELECT bit 724. The T/NT field 722 comprises a direction prediction of the branch, i.e., it indicates whether the branch is predicted taken or not taken. Preferably, the T/NT field 722 comprises a two-bit up/down saturating counter, for specifying the four states strongly taken, weakly taken, weakly not taken, and strongly not taken. In another embodiment, the T/NT field 722 comprises a single T/NT bit.

The SELECT bit 724 is used to select between the BTAC 402 T/NT direction prediction 722 and a direction prediction made by a branch history table (BHT) 1202 (see FIG. 12) external to the BTAC 402, as described with respect to FIG. 12. In one embodiment, if after execution of the branch, the selected predictor (i.e., BTAC 402 or BHT 1202) correctly predicted the direction, the SELECT bit 724 is not updated. However, if the selected predictor incorrectly predicted the direction but the other predictor correctly predicted the direction, the SELECT bit 724 is updated to indicate the non-selected predictor rather than the selected predictor.

In one embodiment, the SELECT bit 724 comprises a two-bit up/down saturating counter, for specifying the four states strongly BTAC, weakly BTAC, weakly BHT, and strongly BHT. In this embodiment, if after execution of the branch, the selected predictor (i.e., BTAC 402 or BHT 1202) correctly predicted the direction, the saturating counters count toward the selected predictor. If the selected predictor incorrectly predicted the direction but the other predictor correctly predicted the direction, the saturating counters count toward the non-selected predictor.

Referring now to FIG. 8, a flowchart illustrating operation of the speculative branch prediction apparatus 400 of FIG. 4 according to the present invention is shown. The BTAC 402 of FIG. 4 is indexed by the fetch address 495 of FIG. 4. In response, the BTAC 402 comparators 604 of FIG. 6 generate the HIT signal 452 of FIG. 4 in response to the BTAC 402 tag array 614 virtual tags 616 of FIG. 6. The control logic 404 of FIG. 4 examines the HIT signal 452 to determine whether the fetch address 495 was a hit in the BTAC 402, in step 802.

If a BTAC 402 hit did not occur, then the control logic 404 does not speculatively branch, in step 822. That is, the control logic 404 controls the multiplexer 422 via control signal 478 of FIG. 4 to select one of the inputs other than the BTAC 402 target address 352 and speculative call/return stack 406 return address 353.

However, if a BTAC 402 hit did occur, the control logic 404 determines whether the A entry 624 of FIG. 6 is valid, seen and taken, in step 804.

The control logic 404 determines the entry 624 is "valid" if the VALID bit 702 of FIG. 7 is set. If the VALID bit 702 is set, the line of the instruction cache 432 selected by the fetch address 495 is presumed to contain a branch instruction for which branch prediction information was previously cached in the A entry 624; however, as discussed above, there is no certainty the selected instruction cache 432 line contains a branch instruction.

The control logic 404 determines the entry 624 is "taken" if the T/NT field 722 of FIG. 7 for entry A 624 indicates the presumed branch instruction direction is predicted taken. In the embodiment of FIG. 12 described below, the control logic 404 determines the entry 624 is "taken" if the selected direction indicator indicates the presumed branch instruction direction is predicted taken.

The control logic 404 determines the entry 624 is "seen" if the BEG field 446 of FIG. 7 is greater than or equal to the corresponding least significant bits of the fetch address 495. That is, the BEG field 446 is compared with the corresponding least significant bits of the fetch address 495 to determine whether the next instruction fetch location is before the location of the branch instruction in the instruction cache 432 corresponding to the A entry 6624. For example, assume the A entry 624 BEG field 446 contains a value of 3, yet the lower bits of the fetch address 495 are 8. In this case, the A entry 624 branch instruction could not possibly be branched to by this fetch address 495. Consequently, the control logic 404 will not speculatively branch to the A entry 624 target address 714. This is particularly relevant where the fetch address 495 is the target address of a branch instruction.

If the A entry 624 is valid, predicted taken, and is seen, the control logic 404 examines the B entry 626 of FIG. 6 is valid, seen and taken, in step 806. The control logic 404 determines whether the B entry 626 is valid, seen and taken in a manner similar to the one described with respect to step 804 for the A entry 624.

If the A entry 624 is valid, predicted taken, and is seen, but the B entry 626 is not valid, predicted not taken, or is not seen, the control logic 404 examines the RET field 706 of FIG. 7 to determine whether the A entry 624 has cached return instruction information, in step 812. If the RET bit 706 is not set, the control logic 404 controls A/B mux 608 of FIG. 6 to select entry A 624 and controls multiplexer 422 via control signal 478 to speculatively branch to the BTAC 402 entry A 624 target address 714 provided on target address signal 352, in step 814. Conversely, if the RET bit 706 indicates a return instruction is presumably present in the instruction cache 432 line selected by the fetch address 495, the control logic 404 controls multiplexer 422 via control signal 478 to speculatively branch to the speculative call/return stack 406 return address 353 of FIG. 4, in step 818.

After speculatively branching during step 814 or step 818, the control logic 404 generates an indication on control signal 482 that that a speculative branch was performed in response to the BTAC 402, in step 816. That is, regardless of which of the speculative call/return stack 406 return address 353 or BTAC 402 entry A 624 target address 352 the processor 300 speculatively branched to, the control logic 404 indicates on control signal 482 that a speculative branch was performed. The control signal 482 is used to set the SB bit 438 for a byte of the instruction when it proceeds into the instruction buffer 342 of FIG. 3 from the instruction cache 432. In one embodiment, the control logic 404 uses the BEG 446 field of the entry 602 to set the SB bit 438 for the opcode byte within the instruction buffer 342 associated with the branch instruction whose SBI 454 was presumably cached in the BTAC 402 at the fetch address 495 hitting in the BTAC 402.

If the A entry 624 is invalid, or is predicted not taken, or is not seen, as determined during step 804, the control logic 404 determines whether the B entry 626 is valid, seen and taken, in step 824. The control logic 404 determines whether the B entry 626 is valid, seen and taken in a manner similar to the one described with respect to step 804 for the A entry 624.

If the B entry 626 is valid, predicted taken, and is seen, the control logic 404 examines the RET field 706 to determine whether the B entry 626 has cached return instruction information, in step 832. If the RET bit 706 is not set, the control logic 404 controls A/B mux 608 of FIG. 6 to select entry B 626 and controls multiplexer 422 via control signal 478 to speculatively branch to the BTAC 402 entry B 626 target address 714 provided on target address signal 352, in step 834. Conversely, if the RET bit 706 indicates a return instruction is presumably present in the instruction cache 432 line selected by the fetch address 495, the control logic 404 controls multiplexer 422 via control signal 478 to speculatively branch to the speculative call/return stack 406 return address 353, in step 818.

After speculatively branching during step 834 or step 818, the control logic 404 generates an indication on control signal 482 that that a speculative branch was performed in response to the BTAC 402, in step 816.

If both the A entry 624 and the B entry 626 are invalid, predicted not taken, or are not seen, the control logic 404 does not speculatively branch, in step 822.

If both the A entry 624 and the B entry 626 are valid, predicted taken, and seen, the control logic 404 determines which of the presumed branch instructions whose information is cached in the A entry 624 and B entry 626 is the first seen of the valid and taken branch instructions in the instruction cache 432 line instruction bytes 494, in step 808. That is, if both of the presumed branch instructions are seen, valid and taken, the control logic 404 determines which of the presumed branch instructions has the smaller memory address by comparing the BEG 446 fields of the A entry 624 and B entry 626. If the B entry 626 BEG 446 value is smaller than the A entry 624 BEG 446 value, then the control logic 404 proceeds to step 832 to speculatively branch based on the B entry 626. Otherwise, the control logic 404 proceeds to step 812 to speculatively branch based on the A entry 624.

In one embodiment, the speculative call/return stack 406 is not present. Hence, steps 812, 818, and 832 are not performed.

It may be observed from FIG. 8 that the present invention advantageously provides a means for caching a target address and speculative branch information for multiple branch instructions in a given instruction cache line in a branch target address cache not integrated into the instruction cache. In particular, the caching of the branch instruction location information within the cache line in the BEG field 446 advantageously enables the control logic 404 to determine which of the potentially multiple branch instructions within the cache line to speculatively branch upon without having to pre-decode the cache line. That is, the BTAC 402 predicts the target address considering the possibility that two or more branch instructions may be present in the selected cache line without knowing how many, if any, branch instructions are present in the cache line.

Figure 9:
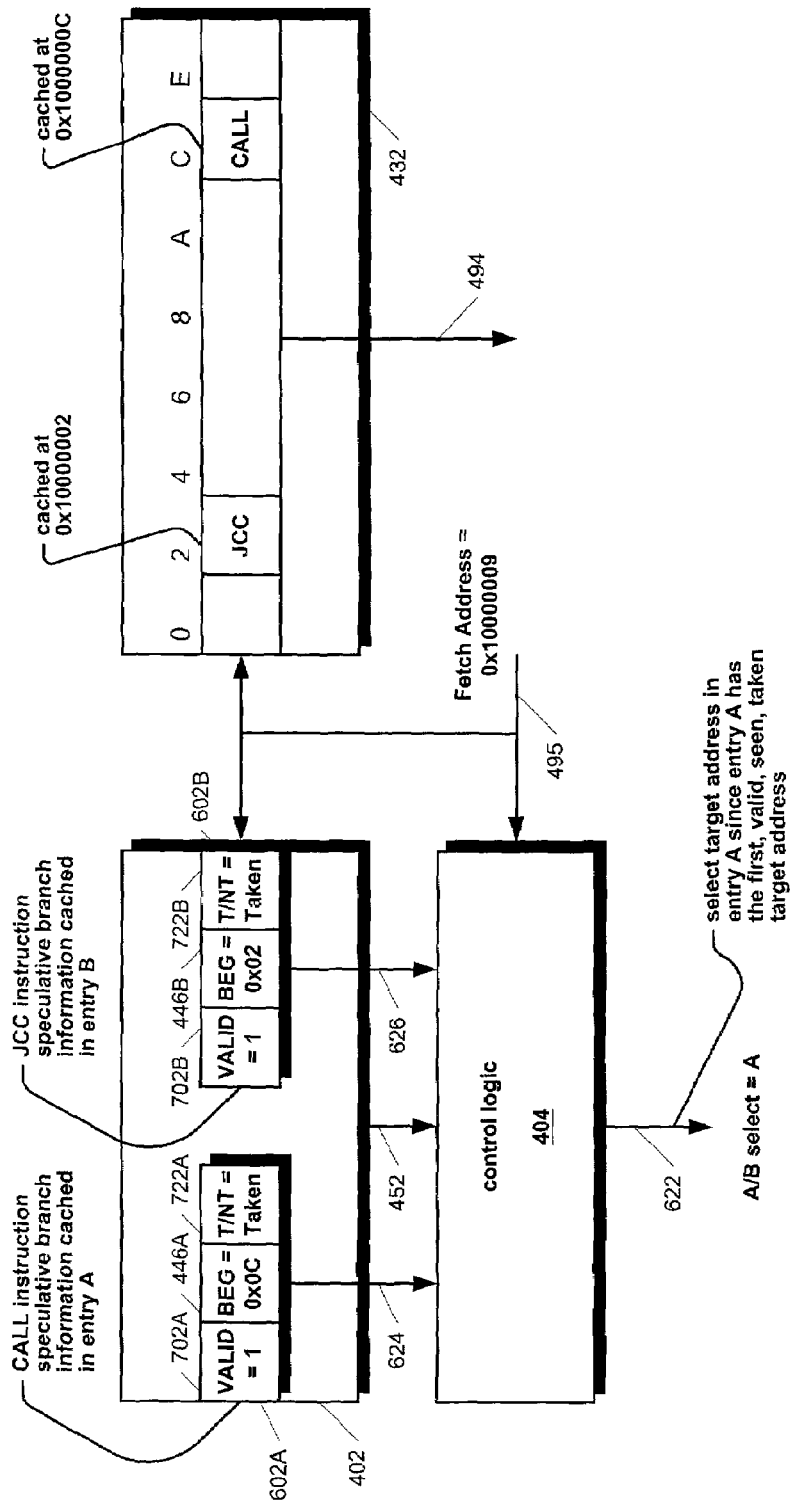
FIG. 9 is a block diagram illustrating an example of operation of the speculative branch prediction apparatus of FIG. 4 using the steps of FIG. 8 to select a target address according to the present invention.

Referring now to FIG. 9, a block diagram illustrating an example of operation of the speculative branch prediction apparatus 400 of FIG. 4 using the steps of FIG. 8 to select a target address 352 of FIG. 4 according to the present invention is shown. The example shows a fetch address 495 with a value of 0x10000009 indexing the instruction cache 432 and BTAC 402 and also being provided to the control logic 404 of FIG. 4. For simplicity and clarity, the information associated with the multi-way associativity of the instruction cache 432 and BTAC 402, such as the multiple ways and way mux 606 of FIG. 6, are not shown. A line 494 of the instruction cache 432 is selected by the fetch address 495. The line 494 includes an x86 conditional jump instruction (JCC) cached at address 0x10000002 and an x86 CALL instruction cached at address 0x1000000C.

The example also shows portions of an A entry 602A and a B entry 602B within a line of the BTAC 402 selected by the fetch address 495. Entry A 602A contains cached information associated with the CALL instruction and entry B 602B contains cached information for the JCC instruction. Entry A 602A shows a VALID bit 702A set to 1 to indicate a valid entry A 602A, i.e., that the associated target address 714 and SBI 454 of FIG. 7 are valid. Entry A 602A also shows a BEG field 446A with a value of 0x0C, corresponding to the least significant bits of the instruction pointer address of the CALL instruction. Entry A 602A also shows a T/NT field 722A with a value of Taken, indicating the CALL instruction is predicted Taken. The A entry 602A is provided to the control logic 404 via signals 624 of FIG. 6 in response to the fetch address 495.

Entry B 602B shows a VALID bit 702B set to 1 to indicate a valid entry B 602B. Entry B 602B also shows a BEG field 446B with a value of 0x02, corresponding to the least significant bits of the instruction pointer address of the JCC instruction. Entry B 602B also shows a T/NT field 722B with a value of Taken, indicating the JCC instruction is predicted Taken. The B entry 602B is provided to the control logic 404 via signals 626 of FIG. 6 in response to the fetch address 495.

In addition, the BTAC 402 asserts the HIT signal 452 to indicate that the fetch address 495 caused a hit in the BTAC 402. The control logic 404 receives entry A 602A and entry B 602B and generates A/B select signal 622 of FIG. 6 based on the HIT signal 452, the fetch address 495 value, and the two entries 602A and 602B according to the method described in FIG. 8.

The control logic 404 determines during step 802 that a hit occurred in the BTAC 402 based on the HIT signal 452 being asserted. The control logic 404 next determines during step 804 that entry A 602A is valid based on the VALID bit 702A being set. The control logic 404 also determines during step 804 that entry A 602A is taken, since the T/NT field 722A indicates Taken. The control logic 404 also determines during step 804 that entry A 602A is seen, since the BEG field 446A value of 0x0C is greater than or equal to the corresponding lower bits of the fetch address 495 value of 0x09. Since entry A 602A is valid, taken, and seen, the control logic 404 proceeds to step 806.

The control logic 404 determines during step 806 entry B 602B is valid based on the VALID bit 702B being set. The control logic 404 also determines during step 806 that entry B 602B is taken, since the T/NT field 722B indicates Taken. The control logic 404 also determines during step 806 that entry B 602B is not seen, since the BEG field 446B value of 0x02 is less than the corresponding lower bits of the fetch address 495 value of 0x09. Since entry B 602B is not seen, the control logic 404 proceeds to step 812.

The control logic 404 determines during step 812 that the cached instruction associated with entry A 602A is not a return instruction via a clear RET bit 706 of FIG. 7, and proceeds to step 814. During step 814 the control logic 404 generates a value on the A/B select signal 622 to cause the A/B mux 608 of FIG. 6 to select entry A 602A on signals 624. The selection causes the target address 714 of FIG. 7 of entry A 602A to be selected as target address 352 of FIG. 3 for provision to the fetch address 495 select mux 422 of FIG. 4.

Hence, as may be seen from the example of FIG. 9, the branch prediction apparatus 400 of FIG. 4 advantageously operates to select the first, valid, seen, taken entry 602 of the selected BTAC 402 line for speculatively branching the processor 300 to the associated target address 714 contained therein. Advantageously, the apparatus 400 advantageously accomplishes speculatively branching even if multiple branch instructions are present in the corresponding selected instruction cache 432 line 494 without knowledge of the actual contents of the selected line 494.

Figure 10:
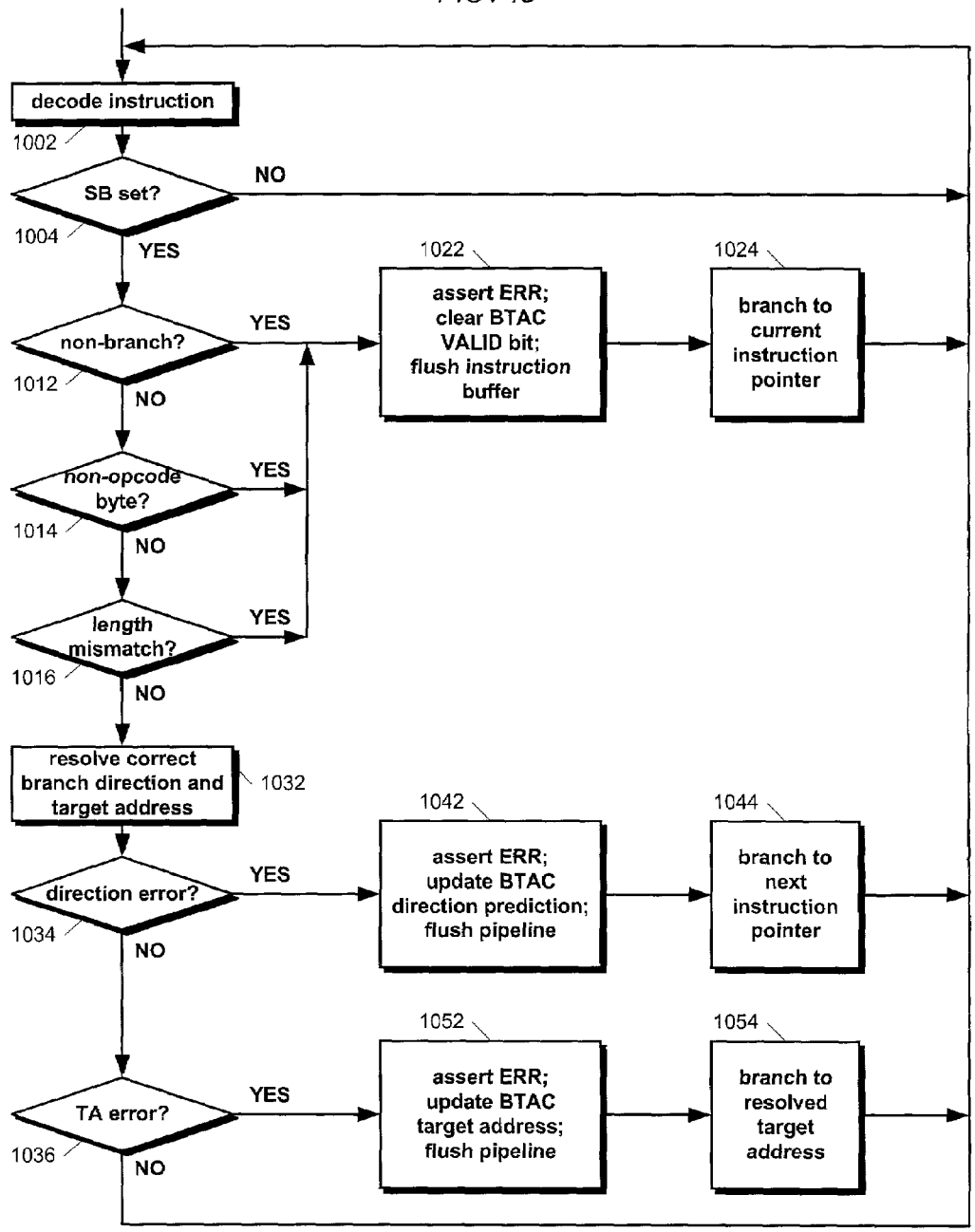
FIG. 10 is a flowchart illustrating operation of the speculative branch prediction apparatus of FIG. 4 to detect and correct erroneous speculative branch predictions according to the present invention.

Referring now to FIG. 10, a flowchart illustrating operation of the branch prediction apparatus 400 of FIG. 4 to detect and correct erroneous speculative branch predictions according to the present invention is shown. After an instruction is received from the instruction buffer 342, the instruction decode logic 436 of FIG. 4 decodes the instruction, in step 1002. In particular, the instruction decode logic 436 formats the stream of instruction bytes into a distinct x86 macroinstruction, and determines the length of the instruction and whether the instruction is a branch instruction.

Next, the prediction check logic 408 of FIG. 4 determines whether the SB bit 438 is set for any of the instruction bytes of the instruction being decoded, in step 1004. That is, the prediction check logic 408 determines whether a speculative branch was previously performed based on a BTAC 402 hit of the currently decoded instruction. If no speculative branch was performed, then no action is taken to correct it.

If a speculative branch was performed, then the prediction check logic 408 examines the currently decoded instruction to determine whether the instruction is a non-branch instruction, in step 1012. Preferably, the prediction check logic 408 determines whether the instruction is a non-branch instruction for the x86 instruction set.

If the instruction is not a branch instruction, the prediction check logic 408 asserts the ERR signal 456 of FIG. 4 to indicate the detection of an erroneous speculative branch, in step 1022. In addition, the BTAC 402 is updated via update signal 442 of FIG. 4 to clear the VALID bit 702 of FIG. 7 for the corresponding BTAC 402 entry 602 of FIG. 6. Furthermore, the instruction buffer 342 of FIG. 3 is flushed of the instructions erroneously fetched from the instruction cache 432 because of the erroneous speculative branch.

If the instruction is not a branch instruction, the control logic 404 next controls multiplexer 422 of FIG. 4 to branch to the CIP 468 generated by the instruction decode logic 436 to correct for the erroneous speculative branch, in step 1024. The branch during step 1024 will cause the instruction cache 432 line including the instruction to be re-fetched and speculatively predicted. However, this time, the VALID bit 702 will be clear for the instruction; consequently, no speculative branch will be performed for the instruction, thereby accomplishing the correction of the previous erroneous speculative branch.

If it is determined during step 1012 that the instruction is a valid branch instruction, the prediction check logic 408 determines whether the SB bit 438 is set for any of the bytes in the instruction in a non-opcode byte location within the instruction bytes of the decoded instruction, in step 1014. That is, although a byte may contain a valid opcode value for the processor 300 instruction set, the valid opcode value may be in a byte location that is not valid for the instruction format. For an x86 instruction, barring prefix bytes, the opcode byte should be the first byte of the instruction. For example, the SB bit 438 may erroneously be set for a branch opcode value in an immediate data or displacement field of the instruction, or in a mod R/M or SIB byte of an x86 instruction due to a virtual aliasing condition. If the branch opcode byte is in a non-opcode byte location, then steps 1022 and 1024 are performed to correct the erroneous speculative prediction.

If the prediction check logic 408 determines during step 1012 that the instruction is a valid branch instruction, and determines during step 1014 no SB bits 438 are set for non-opcode bytes, then the prediction check logic 408 determines whether there is a speculative and non-speculative instruction length mismatch, in step 1016. That is, the prediction check logic 408 compares the non-speculative instruction length generated by the instruction decode logic 436 during step 1002 with the speculative LEN 448 field of FIG. 7 generated by the BTAC 402. If the instruction lengths do not match, then steps 1022 and 1024 are performed to correct the erroneous speculative prediction.

If the prediction check logic 408 determines during step 1012 that the instruction is a valid branch instruction, and determines during step 1014 the SB bit 438 is set only for the opcode byte, and determines during step 1016 the instruction lengths match, then the instruction proceeds down the pipeline 300 until it reaches the E-stage 326 of FIG. 3. The E-stage 326 resolves the correct branch instruction target address 356 of FIG. 3 and also determines the correct branch direction DIR 481 of FIG. 4, in step 1032.

Next, the prediction check logic 408 determines whether the BTAC 402 erroneously predicted the direction of the branch instruction, in step 1034. That is, the prediction check logic 408 compares the correct direction DIR 481 resolved by the E-stage 326 with the prediction 722 of FIG. 7 generated by the BTAC 402 to determine if an erroneous speculative branch was performed.

If the BTAC 402 predicted an erroneous direction, the prediction check logic 408 asserts the ERR signal 456 to notify the control logic 404 of the error, in step 1042. In response, the control logic 404 updates the BTAC 402 direction prediction 722 via update signal 442 of FIG. 4 for the corresponding BTAC 402 entry 602 of FIG. 6. Finally, the control logic 404 flushes the processor pipeline 300 of the instructions erroneously fetched from the instruction cache 432 because of the erroneous speculative branch, in step 1042. Next, the control logic 404 controls the multiplexer 422 to select the NSIP 466 of FIG. 4, causing the processor 300 to branch to the next instruction after the branch instruction to correct the erroneous speculative branch, in step 1044.

If no direction error is detected during step 1034, the prediction check logic 408 determines whether the BTAC 402 or speculative call/return stack 406 erroneously predicted the target address of the branch instruction, in step 1036. That is, if the processor 300 speculatively branched to the BTAC 402 target address 352, then the prediction check logic 408 examines the result 485 of comparator 489 of FIG. 4 to determine whether the speculative target address 352 mismatches the resolved correct target address 356. Alternatively, if the processor 300 speculatively branched to the speculative call/return stack 406 return address 353, then the prediction check logic 408 examines the result 487 of comparator 497 of FIG. 4 to determine whether the speculative return address 353 mismatches the resolved correct target address 356.

If a target address error is detected during step 1036, the prediction check logic 408 asserts the ERR signal 456 to indicate the detection of an erroneous speculative branch, in step 1052. In addition, the control logic 404 updates the BTAC 402 via update signal 442 with the resolved target address 356 generated during step 1032 for the corresponding BTAC 402 entry 602 of FIG. 6. Furthermore, the pipeline 300 is flushed of the instructions erroneously fetched from the instruction cache 432 because of the erroneous speculative branch. Next, the control logic 404 controls multiplexer 422 of FIG. 4 to branch to the resolved correct target address 356, thereby correcting the previous erroneous speculative branch, in step 1054.

Referring now to FIG. 11, sample code fragments and a table 1100 illustrating an example of the speculative branch misprediction detection and correction of FIG. 10 according to the present invention is shown. The code fragments comprise a previous code fragment and a current code fragment. For example, the previous code fragment illustrates the code present in the instruction cache 432 of FIG. 4 at a virtual address 0x00000010 prior to a task switch of the processor 300 of FIG. 3. The current code fragment illustrates the code present in the instruction cache 432 at virtual address 0x00000100 after the task switch, such as may occur in a virtual aliasing condition.

The previous code sequence includes an x86 JMP (unconditional jump) instruction at address location 0x00000010. The target address of the JMP is address 0x00001234. The JMP has already been executed; hence, the target address 0x00001234 is already cached in the BTAC 402 of FIG. 4 for address 0x00000010 at the time the current code sequence executes. That is, the target address 714 is cached, the VALID bit 702 is set, the BEG 446, LEN 448, and WRAP 708 fields are populated with appropriate values, and the CALL 704 and RET 706 bits of FIG. 7 are cleared. In this example, it is assumed the T/NT field 722 indicates the cached branch will be taken and the JMP is cached in the A entry 624 of the BTAC 402 line.

The current code sequence includes an ADD (arithmetic add) instruction at 0 x00000010, the same virtual address of the JMP instruction in the previous code sequence. At location 0x00001234 in the current code sequence is a SUB (arithmetic subtract) instruction, and at 0x00001236 is an INC (arithmetic increment) instruction.

The table 1100 comprises eight columns and six rows. The last seven columns of the first row designate seven clock cycles, 1 through 7. The last five rows of the first column designate the first five stages of the pipeline 300, namely the I-stage 302, B-stage 304, U-stage 306, V-stage 308, and F-stage 312. The remaining cells of the table specify the contents of each of the stages during the various clock cycles while executing the current code sequence.

During clock cycle 1, the BTAC 402 and instruction cache 432 are accessed. The ADD instruction is shown in I-stage 302. The fetch address 495 of FIG. 4 with a value of 0x00000010 indexes the instruction cache 432 and the BTAC 402 for determining if a speculative branch is necessary according to FIG. 8. In the example of FIG. 11, a BTAC 402 hit will occur for a fetch address 495 value of 0x00000010 as discussed below.

During clock cycle 2, the ADD instruction is shown in the B-stage 304. This is the second clock of the instruction cache 432 fetch cycle. The tag array 614 provides the tags 616 and the data array 612 provides the entries 602 of FIG. 6, including the target address 714 and SBI 454 of FIG. 7 for each of the entries 602. The comparators 604 of FIG. 6 generate a tag hit on signal 452 of FIG. 4 according to step 802 of FIG. 8 since the JMP of the previous code sequence had been cached after its execution. The comparators 604 also control way mux 606 via signal 618 to select the appropriate way. The control logic 404 examines the SBI 454 of the A entry 624 and B entry 626 and selects the A entry 624 in this example for provision as the target address 352 and SBI 454., The control logic 404 also determines that the entry is valid, taken, seen, and is not a return instruction in this example according to steps 804 and 812.

During cycle 3, the ADD instruction is shown in U-stage 306. The ADD instruction is provided by the instruction cache 432 and latched in the U-stage 306. Because of steps 802 through 814 of FIG. 8 being performed during clock cycle 2, the control logic 404 controls multiplexer 422 of FIG. 4 via control signal 478 to select the target address 352 provided by the BTAC 402.

During clock cycle 4, the ADD proceeds to the V-stage 308, where it is written to the instruction buffer 342. Clock cycle 4 is the speculative branch cycle. That is, the processor 300 begins fetching instructions at the cached target address 352 value 0x00001234 according to step 814 of FIG. 8. That is, the fetch address 495 is changed to address 0x00001234 to accomplish a speculative branch to that address according to FIG. 8. Hence, the SUB instruction, located at address 0x00001234, is shown in the I-stage 302 during clock cycle 4. Additionally, the control logic 404 indicates via signal 482 of FIG. 4 that a speculative branch has been performed. Consequently, an SB bit 438 is set in the instruction buffer 342 corresponding to the ADD instruction according to step 816 of FIG. 8.

During clock cycle 5, the error in the speculative branch is detected. The ADD instruction proceeds to the F-stage 312. The SUB instruction proceeds to the B-stage 304. The INC instruction, the instruction at the next sequential instruction pointer, is shown in the I-stage 302. The F-stage 312 instruction decode logic 436 of FIG. 4 decodes the ADD instruction and generates the CIP 468 of FIG. 4. The prediction check logic 408 detects via signal 484 that an SB bit 438 associated with the ADD instruction is set according to step 1004. The prediction check logic 408 also detects that the ADD instruction is a non-branch instruction according to step 1012, and subsequently asserts the ERR signal 456 of FIG. 4 according to step 1022 to signify the erroneous speculative branch performed during cycle 4.

During clock cycle 6, the erroneous speculative branch is invalidated. The instruction buffer 342 is flushed according to step 1022. In particular, the ADD instruction is flushed from the instruction buffer 342. Additionally, the BTAC 402 is updated to clear the VALID bit 702 associated with the entry 602 that caused the erroneous speculative branch according to step 1022. Furthermore, the control logic 404 controls multiplexer 422 to select the CIP 468 as the fetch address 495 during the next cycle.

During clock cycle 7, the erroneous speculative branch is corrected. The processor 300 begins fetching instructions from the instruction cache 432 at the instruction pointer of the ADD instruction that was being decoded by the instruction decode logic 436 when the error was detected during clock cycle 5. That is, the processor 300 branches to CIP 468 corresponding to the ADD instruction according to step 1024, thereby correcting the erroneous speculative branch performed during clock cycle 5. Hence, the ADD instruction is shown in the I-stage 302 during clock cycle 7. This time, the ADD will proceed down the pipeline 300 and execute.

Referring now to FIG. 12, a block diagram illustrating an alternate embodiment of the branch prediction apparatus 400 of FIG. 4 including a hybrid speculative branch direction predictor 1200 according to the present invention is shown. It may be readily observed that the more accurate the branch direction prediction of the BTAC 402, the more effective speculative branching to the speculative target address 352 generated by the BTAC 402 is in reducing branch delay penalty. Stated conversely, the less frequently an erroneous speculative branch must be corrected, as described with respect to FIG. 10, the more effective speculative branching to the speculative target address 352 generated by the BTAC 402 is in reducing the processor 300 average branch delay penalty. The direction predictor 1200 comprises the BTAC 402 of FIG. 4, a branch history table (BHT) 1202, exclusive OR logic 1204, global branch history registers 1206 and a multiplexer 1208.

The global branch history registers 1206 comprise a shift register for storing a global history of branch instruction direction outcomes 1212 for all branch instructions executed by the processor 300 received by the global branch history registers 1206. Each time the processor 300 executes a branch instruction, the DIR 481 bit of FIG. 4 is written into the shift register 1206 with the bit set if the branch direction was taken and the bit clear if the branch direction was not taken. Accordingly, the oldest bit is shifted out of the shift register 1206. In one embodiment, the shift register 1206 stores 13 bits of global history. The storage of global branch history is well known in the art of branch prediction for improving prediction of the outcome of branch instructions that exhibit a high dependency with other branch instructions in a program.

The global branch history 1206 is provided via signals 1214 to the exclusive OR logic 1204 for performance of a logical exclusive OR operation with the fetch address 495 of FIG. 4. The output 1216 of the exclusive OR logic 1204 is provided as an index to the branch history table 1202. The function performed by the exclusive OR logic 1204 is commonly referred to as a gshare operation in the art of branch prediction.

The branch history table 1202 comprises an array of storage elements for storing a history of branch direction outcomes for a plurality of branch instructions. The array is indexed by the output 1216 of the exclusive OR logic 1204. When the processor 300 executes a branch instruction, the array element of the branch history table 1202 indexed by the exclusive OR logic 1204 output 1216 is selectively updated via signal 1218 as a function of the resolved branch direction DIR 481.

In one embodiment, each of the storage elements in the branch history table 1202 array comprises two direction predictions: an A and B direction prediction. Preferably, the branch history table 1202 generates the A and B direction predictions on T/NT_A/B 1222 signals as shown, for specifying a direction prediction to be selected against each of the A entry 624 and B entry 626 of FIG. 6 generated by the BTAC 402. In one embodiment, the branch history table 1202 array of storage elements comprises 4096 entries each storing two direction predictions.

In one embodiment, each of the A and B predictions comprises a single T/NT (taken/not taken) bit. In this embodiment, the single T/NT bit is updated with the value of the DIR bit 481. In another embodiment, each of the A and B predictions comprises a two-bit up/down saturating counter, for specifying the four states strongly taken, weakly taken, weakly not taken, and strongly not taken. In this embodiment, the saturating counters count in the direction indicated by the DIR bit 481.

The mux 1208 receives the two direction prediction bits T/NT_A/B 1222 from the branch history table 1202 and the T/NT direction prediction 722 of FIG. 7 for each of the A entry 624 and B entry 626 from the BTAC 402. The mux 1208 receives as select control signals the SELECT bit 724 for each of the A entry 624 and B entry 626 from the BTAC 402. The A entry 624 SELECT bit 724 selects from among the two A inputs a T/NT for the A entry 624. The B entry 626 SELECT bit 724 selects from among the two B inputs a T/NT for the B entry 626. The two selected T/NT bits 1224 are provided to the control logic 404 for use in controlling multiplexer 422 via signal 478 of FIG. 4. In the embodiment of FIG. 12, the two selected T/NT bits 1224 are comprised in entry A 624 and entry B 626, respectively, shown in FIG. 6 provided to the control logic 404.

It may be observed that if the processor 300 branches to the target address 352 generated by the BTAC 402 based, at least in part, on the direction predictions 1222 provided by the branch history table 1202, it does so speculatively. The branch is speculative because, although a hit in the BTAC 402 indicates that a branch instruction was previously present in the instruction cache 432 line selected by the fetch address 495, there is no certainty that a branch instruction resides in the selected instruction cache 432 line, as discussed above.

It may also be observed that the hybrid speculative branch direction predictor 1200 of FIG. 12 potentially advantageously provides a more accurate branch direction prediction than the BTAC 402 direction prediction 722 alone. In particular, generally speaking, the branch history table 1202 provides a more accurate prediction for branches that are highly dependent upon the history of other branches; whereas, the BTAC 402 provides a more accurate prediction for branches that are not highly dependent upon the history of other branches. The SELECT bits 724 enable a selection of the more accurate predictor for a given branch. Thus, it may be observed that the direction predictor 1200 of FIG. 12 advantageously works in conjunction with the BTAC 402 to enable more accurate speculative branching using the target address 352 provided by the BTAC 402.

Referring now to FIG. 13, a flowchart illustrating operation of the dual call/return stacks 406 and 414 of FIG. 4 is shown. It is a characteristic of computer programs that subroutines may be called from multiple locations within the program. Consequently, the return address for a return instruction within the subroutine may vary widely. Thus, it has been observed that it is often difficult to predict a return address using a branch target address cache, thereby necessitating the advent of call/return stacks. The dual call/return address stack scheme of the present invention provides the benefits of call/return stacks generally, i.e., more accurate prediction of return addresses than a simple BTAC, in addition to the benefits of the speculative BTAC of the present invention, such as prediction of a branch target address early in the pipeline 300 in order to reduce the branch penalty.

The BTAC 402 of FIG. 4 is indexed by the fetch address 495 of FIG. 4 and the control logic 404 of FIG. 4 examines the HIT signal 452 to determine whether the fetch address 495 was a hit in the BTAC 402 and examines the VALID bit 702 of the SBI 454 to determine whether the selected BTAC 402 entry 602 is valid, in step 1302. If a BTAC 402 hit did not occur or the VALID bit 702 is not set, then the control logic 404 does not cause the processor 300 to speculatively branch.

If a valid BTAC 402 hit occurred during step 1302, then the control logic 404 examines the CALL bit 704 of FIG. 7 of the SBI 454 of FIG. 4 to determine whether the cached branch instruction is speculatively, or presumably, a call instruction, in step 1304. If the CALL bit 704 is set, then the control logic 404 controls the speculative call/return stack 406 to push the speculative return address 491, in step 1306. That is, the speculative return address 491 of the presumed call instruction, comprising the sum of the fetch address 495, BEG 446, and LEN 448 of FIG. 4 are saved in the speculative call/return stack 406. The speculative return address 491 is speculative because it is not certain that the line of the instruction cache 432 associated with the fetch address 495 that hit in the BTAC 402 actually contains a call instruction, much less the call instruction for which the BEG 446 and LEN 448 are cached in the BTAC 402. The speculative return address 491, or target address, may be speculatively branched to as provided on return address signal 353 the next time a return instruction is executed, as will be described below with respect to steps 1312 through 1318.

If the CALL bit 704 is set, the control logic 404 next controls the multiplexer 422 to select the BTAC 402 target address 352 of FIG. 3 in order to speculatively branch to the target address 352, in step 1308.

If the control logic 404 determines during step 1304 that the CALL bit 704 is not set, then the control logic 404 examines the RET bit 706 of FIG. 7 of the SBI 454 to determine whether the cached branch instruction is speculatively, or presumably, a return instruction, in step 1312. If the RET bit 706 is set, then the control logic 404 controls the speculative call/return stack 406 to pop the speculative return address 353 of FIG. 3 from the top of its stack, in step 1314.

After popping the speculative return address 353, the control logic 404 controls the multiplexer 422 to select the speculative return address 353 popped off the speculative call/return stack 406 in order to speculatively branch to the return address 353, in step 1316.

The return instruction proceeds down the pipeline 300 until it reaches the F-stage 312 of FIG. 3 and the instruction decode logic 436 of FIG. 4 decodes the presumed return instruction. If the presumed return instruction is in fact a return instruction, the non-speculative call/return stack 414 of FIG. 4 generates a non-speculative return address 355 of FIG. 3 for the return instruction. The comparator 418 of FIG. 4 compares the speculative return address 353 with the non-speculative return address 355 and provides the result 474 to the control logic 404, in step 1318.

The control logic 404 examines the comparator 418 result 474 to determine if a mismatch occurred, in step 1324. If the speculative return address 353 and the non-speculative return address 355 do not match, then the control logic 404 controls multiplexer 422 to select the non-speculative return address 355 in order to cause the processor 300 to branch to the non-speculative return address 355, in step 1326.

If the control logic 404 determines during step 1304 that the CALL bit 704 is not set, and determines during step 1312 that the RET bit 706 is not set, then the control logic 404 controls multiplexer 422 to speculatively branch to the BTAC 402 target address 352 of FIG. 3 as described in steps 814 or 834 of FIG. 8, in step 1322.

Thus, it may observed from FIG. 13, that the operation of the dual call/return stacks of FIG. 4 potentially reduces the branch penalty of call and return instructions. The potential reduction is achieved by enabling the processor 300 to branch earlier in the pipeline for call and return instructions in conjunction with the BTAC 402, while also overcoming the phenomenon that return instructions commonly return to multiple different return addresses by virtue of the fact that subroutines are commonly called from a number of different program locations.

Figure 14:
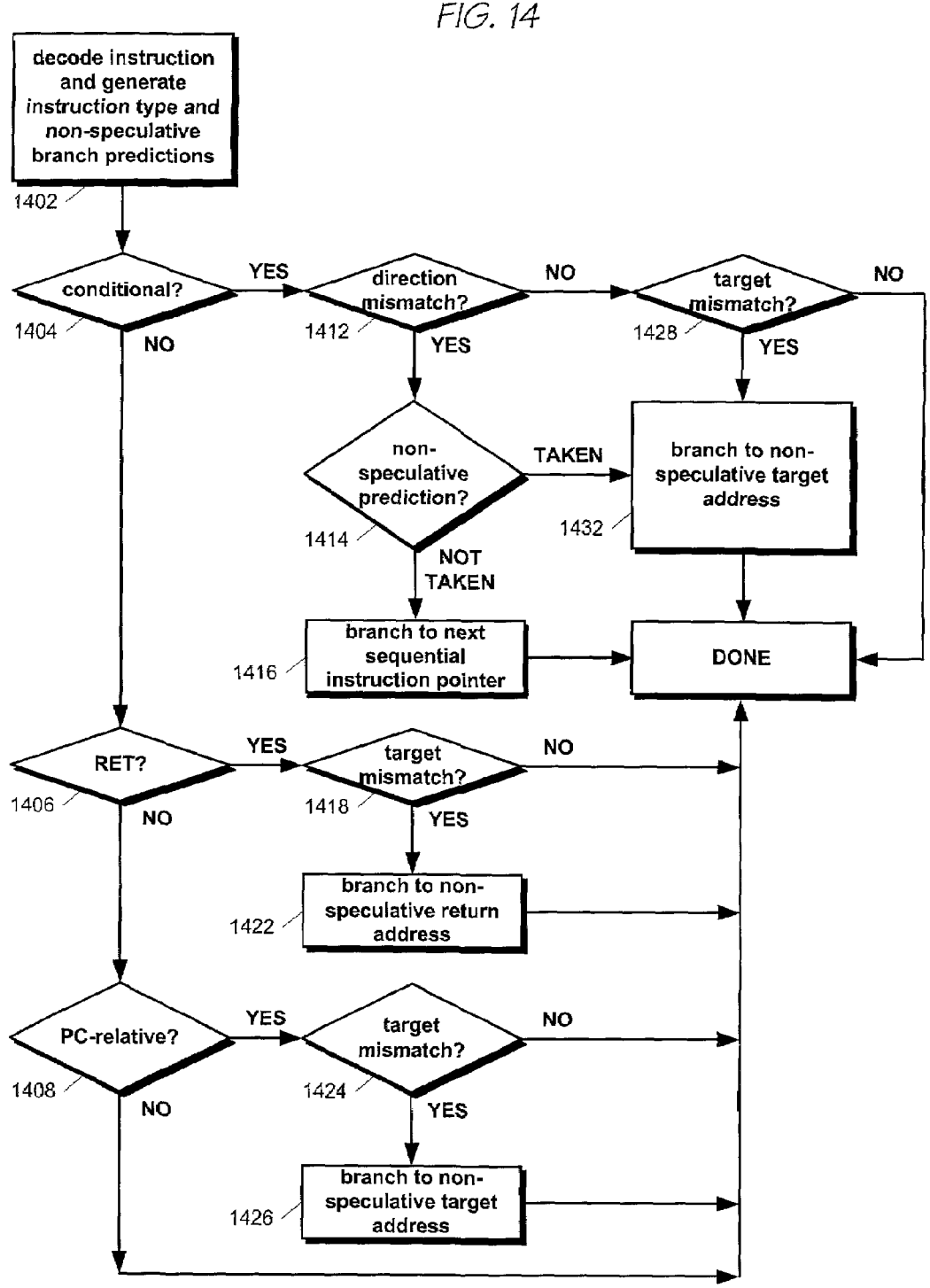
FIG. 14 is a flowchart illustrating operation of the branch prediction apparatus of FIG. 4 to selectively override speculative branch predictions with non-speculative branch predictions thereby improving the branch prediction accuracy of the present invention.

Referring now to FIG. 14, a flowchart illustrating operation of the branch prediction apparatus 400 of FIG. 4 to selectively override speculative branch predictions with non-speculative branch predictions thereby improving the branch prediction accuracy of the present invention is shown. After an instruction is received from the instruction buffer 342, the instruction decode logic 436 of FIG. 4 decodes the instruction and the non-speculative target address calculator 416, non-speculative call/return stack 414, and non-speculative branch direction predictor 412 of FIG. 4 generate non-speculative branch predictions in response to the instruction decode information 492 of FIG. 4, in step 1402. The instruction decode logic 436 generates a type of the instruction provided in the instruction decode information 492, in step 1402.

In particular, the instruction decode logic 436 determines whether the instruction is a branch instruction, the length of the instruction, and the type of the branch instruction. Preferably, the instruction decode logic 436 determines whether the branch instruction is a conditional or unconditional type branch instruction, a PC-relative type branch instruction, a return instruction, a direct type branch instruction, or an indirect type branch instruction.

If the instruction is a branch instruction, the non-speculative branch direction predictor 412 generates the non-speculative direction prediction 444 of FIG. 4. In addition, the non-speculative target address calculator 416 calculates the non-speculative target address 354 of FIG. 3. Finally, if the instruction is a return instruction, the non-speculative call/return stack 414 generates the non-speculative return address 355 of FIG. 3.

The control logic 404 determines whether the branch instruction is a conditional branch instruction, in step 1404. That is, the control logic 404 determines whether the instruction may be taken or not taken depending upon a condition, such as whether certain flag bits are set, such as a zero flag, carry flag, etc. In the x86 instruction set, the JCC instruction is a conditional type branch instruction. In contrast, the RET, CALL and JUMP instructions, for example, are unconditional branch instructions in the x86 instruction set because they always have a direction of taken.

If the branch is a conditional type branch instruction, the control logic 404 determines whether there is a mismatch between the non-speculative direction 444 predicted by the non-speculative branch direction predictor 412 and the speculative direction 722 of FIG. 7 in the SBI 454 predicted by the BTAC 402, in step 1412.

If there is a direction prediction mismatch, the control logic 404 determines whether the non-speculative direction prediction 444 is taken or not taken, in step 1414. If the non-speculative direction prediction 444 is not taken, the control logic 404 controls multiplexer 422 to select the NSIP 466 of FIG. 4 in order to branch to the instruction after the current branch instruction, in step 1416. That is, the control logic 404 selectively overrides the speculative BTAC 402 direction prediction. The speculative direction prediction 722 is overridden because the non-speculative direction prediction 444 is generally more accurate.

If the non-speculative direction prediction 444 is taken, the control logic 404 controls multiplexer 422 to branch to the non-speculative target address 354, in step 1432. Again, the speculative direction prediction 722 is overridden because the non-speculative direction prediction 444 is generally more accurate.

If the control logic 404 determines during step 1412 that there is not a direction prediction mismatch, and that a speculative branch was performed for the branch instruction (i.e., if the SB bit 438 is set), the control logic 404 determines whether there is a mismatch between the speculative target address 352 and the non-speculative target address 354, in step 1428. If there is a target address mismatch for a conditional type branch, the control logic 404 controls multiplexer 422 to branch to the non-speculative target address 354, in step 1432. The speculative target address prediction 352 is overridden because the non-speculative target address prediction 354 is generally more accurate. If there is not a target address mismatch for a conditional type branch, no action is taken. That is, the speculative branch is allowed to proceed, subject to error correction as described with respect to FIG. 10.

If during step 1404, the control logic 404 determines the branch instruction is not a conditional type branch, the control logic 404 determines whether the branch instruction is a return instruction, in step 1406. If the branch instruction is a return instruction, the control logic 404 determines whether there is a mismatch between the speculative return address 353 generated by the speculative call/return stack 406 and the non-speculative return address 355 generated by the non-speculative call/return stack 414, in step 1418.

If there is a mismatch between the speculative return address 353 and the non-speculative return address 355, the control logic 404 controls the multiplexer 422 to branch to the non-speculative return address 355, in step 1422. That is, the control logic 404 selectively overrides the speculative return address 353. The speculative return address 353 is overridden because the non-speculative return address 355 is generally more accurate. If there is not a target address mismatch for a direct type branch, no action is taken. That is, the speculative branch is allowed to proceed, subject to error correction as described with respect to FIG. 10. It is noted that steps 1418 and 1422 correspond to steps 1324 and 1326 of FIG. 13, respectively.

If during step 1406, the control logic 404 determines the branch instruction is not a return instruction, the control logic 404 determines whether the branch instruction is a PC-relative type branch instruction, in step 1408. In the x86 instruction set, a PC-relative type branch instruction is a branch instruction in which a signed offset specified in the branch instruction is added to the current program counter value to compute the target address.

In an alternate embodiment, the control logic 404 also determines whether the branch instruction is a direct type branch instruction, in step 1408. In the x86 instruction set, a direct type branch instruction is a branch instruction in which the target address is specified in the instruction itself. Direct type branch instructions are also referred to as immediate type branch instructions, since the target address is specified in an immediate field of the instruction.

If the branch instruction is a PC-relative type branch instruction, the control logic 404 determines whether there is a mismatch between the speculative target address 352 and the non-speculative target address 354, in step 1424. If there is a target address mismatch for a PC-relative type branch, the control logic 404 controls multiplexer 422 to branch to the non-speculative target address 354, in step 1426. The speculative target address prediction 352 is overridden because the non-speculative target address prediction 354 is generally more accurate for a PC-relative type branch. If there is not a target address mismatch for a PC-relative type branch, no action is taken. That is, the speculative branch is allowed to proceed, subject to error correction as described with respect to FIG. 10.

If during step 1408, the control logic 404 determines the branch instruction is not a PC-relative type branch instruction, no action is taken. That is, the speculative branch is allowed to proceed, subject to error correction as described with respect to FIG. 10. In one embodiment, the non-speculative target address calculator 416 comprises a relatively small branch target buffer (BTB) in the F-stage 312 that caches branch target addresses only for indirect type branch instructions as described above with respect to FIG. 4.

It has been observed that for indirect type branch instructions, the BTAC 402 prediction is generally more accurate than the relatively small F-stage 312 BTB. Hence, if it is determined that the branch is an indirect type branch instruction, the control logic 404 does not override the BTAC 402 speculative prediction. That is, if a speculative branch was performed due to a BTAC 402 hit as described in FIG. 8 for an indirect type branch instruction, the control logic 404 does not override the speculative branch by branching to the indirect type BTB target address. However, even though for indirect type branches the speculative target address 352 generated by the BTAC 402 is not overridden by the non-speculative target address 354, a target address compare will also be performed later in the pipeline 300 between the speculative target address 352 and the non-speculative target address 356 of FIG. 3 received from the S-stage 328 in order to perform step 1036 of FIG. 10 to detect an erroneous speculative branch.

Figure 15:
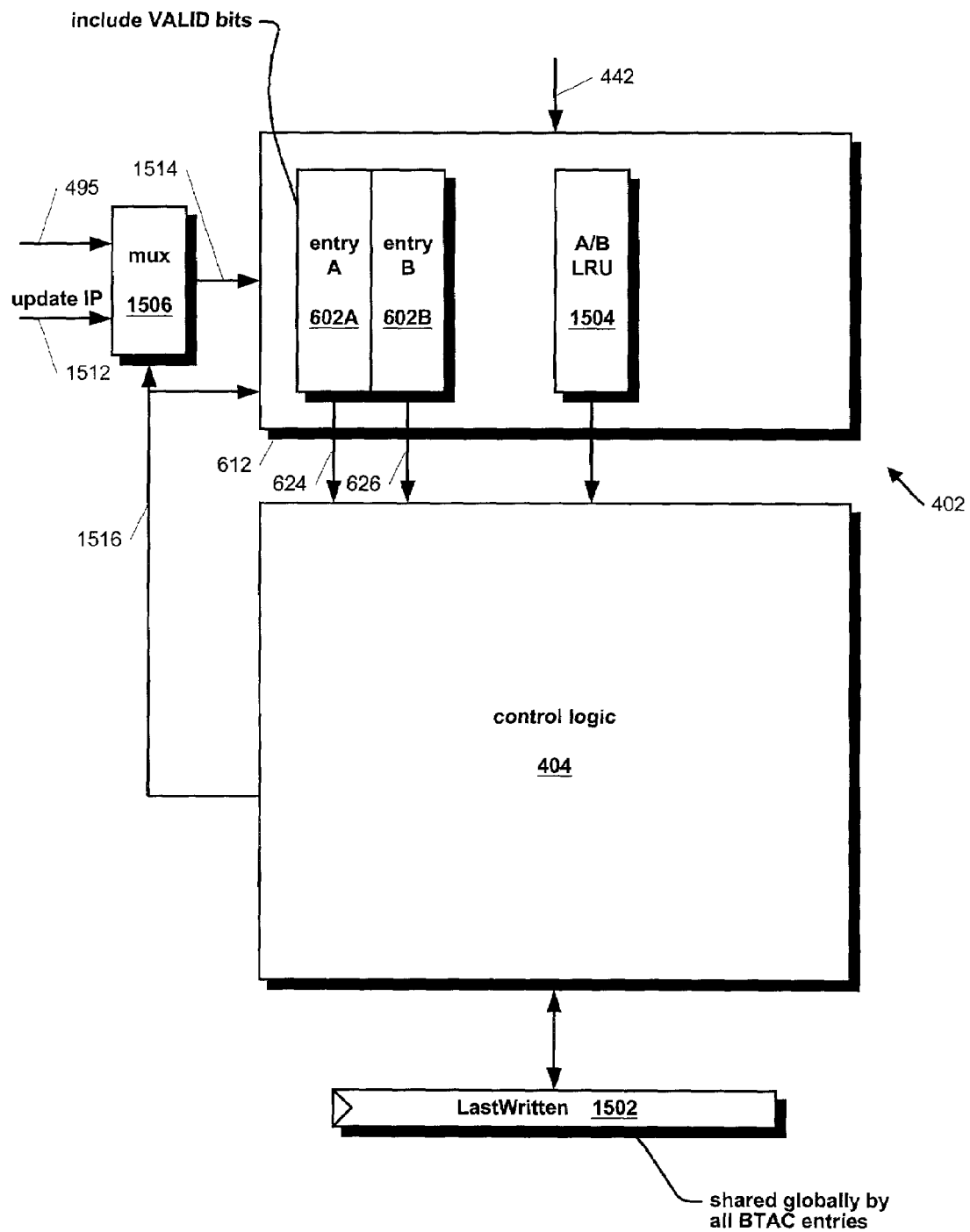
FIG. 15 is a block diagram illustrating an apparatus for replacing a target address in the BTAC of FIG. 4 according to the present invention.

Referring now to FIG. 15, a block diagram illustrating an apparatus for replacing a target address in the BTAC 402 of FIG. 4 according to the present invention is shown. For simplicity and clarity, the information associated with the multi-way associativity of the BTAC 402, such as the multiple ways and way mux 606 of FIG. 6, are not shown. The BTAC 402 data array 612 of FIG. 6 is shown comprising a selected line of the BTAC 402 comprising an entry A 602A and an entry B 602B, which are provided to the control logic 404 via signals 624 and 626 of FIG. 6, respectively. The entry A 602A and entry B 602B include their associated VALID bits 702 of FIG. 7.

The selecting BTAC 402 line also includes an A/B LRU bit 1504 for indicating which of entry A 602A and entry B 602B was least recently used. In one embodiment, each time a BTAC 402 hit occurs on a given target address 714, the A/B LRU bit 1504 is updated to specify the opposite entry of the entry for which the hit occurred. That is, if the control logic 404 proceeds to step 812 of FIG. 8 since a hit occurred on entry A 602A, then the A/B LRU bit 1504 is updated to indicate entry B 602B. Conversely, if the control logic 404 proceeds to step 832 of FIG. 8 since a hit occurred on entry B 602B, then the A/B LRU bit 1504 is updated to indicate entry A 602A. The A/B LRU bit 1504 is also provided to the control logic 404.

The replacement apparatus also includes a multiplexer 1506. The mux 1506 receives as inputs the fetch address 495 of FIG. 4 and an update instruction pointer (IP) 1512. The mux 1506 selects one of the inputs based on a read/write control signal 1516 provided by the control logic 404. The read/write control signal 1516 is also provided to the BTAC 402. When the read/write control signal 1516 indicates "read", the mux 1506 selects the fetch address 495 for provision to the BTAC 402 via signal 1514 for reading the BTAC 402. When the read/write control signal 1516 indicates "write", the mux 1506 selects the update IP 1512 for provision to the BTAC 402 via signal 1514 for writing the BTAC 402 with an updated target address 714 and/or SBI 454 and/or A/B LRU bit 1504 via update signal 442 FIG. 4.

When a branch instruction executes and is taken, the target address 714 of the branch instruction and associated SBI 454 are written into, or cached in, a BTAC 402 entry 602. That is, the BTAC 402 is updated with the new target address 714 of the executed branch instruction and associated SIB 454. The control logic 404 must decide which side, A or B, of the BTAC 402 to update for the BTAC 402 line and way selected by the update IP 1512. That is, the control logic 404 must decide whether to replace the entry A 602A or the entry B 602B of the selected line and way. The control logic 404 decides which side to replace as shown in Table 1 below.

TABLE 1

| Valid A | Valid B | Replace |
|---|---|---|
| 0 | 0 | ~LastWritten |
| 0 | 1 | A |
| 1 | 0 | B |
| 1 | 1 | LRU |

Table 1 is a truth table having two inputs, the VALID bit 702 of entry A 602A and the VALID bit 702 of entry B 602B. The output of the truth table is the action for determining the side of the BTAC 402 to replace. As shown, if the A entry 602A is invalid and the B entry 602B is valid, then the control logic 404 replaces the A entry 602A. If the A entry 602A is valid and the B entry 602B is invalid, then the control logic 404 replaces the B entry 602B. If both the A entry 602A and B entry 602B are valid, then the control logic 404 replaces the least recently used entry as specified by the A/B LRU bit 1504 in the line and way selected by the update IP 1512.

If both the A entry 602A and B entry 602B are invalid, then the control logic 404 must decide which side to replace. One solution is to always write to one side, for example, side A. However, this solution poses a problem illustrated by Code Sequence 1 below.

0x0000010 JMP 0x00000014
0x00000014 ADD BX, 1
0x00000016 CALL 0x12345678
Code Sequence 1.

In Code Sequence 1, the three instructions shown are in the same instruction cache 432 line because their instruction pointer addresses are equal except for the lower 4 address bits; accordingly, the JMP and CALL instructions select the same BTAC 402 line and way. Assume in this example both the A entry 602A and the B entry 602B in the BTAC 402 line and way selected by the instruction pointers for the JMP and CALL instructions are invalid when the instructions execute. Using the solution of "always update side A when both entries are invalid", the JMP instruction would see that both sides are invalid and would update the A entry 602A.

However, since the CALL instruction is relatively close to the JMP instruction in the program sequence, if the pipeline is relatively long, as in processor 300, a relatively large number of cycles may pass before the VALID bit 702 of entry A 602A is updated. Hence, a high probability exists that the CALL instruction will sample the BTAC 402 before the BTAC 402 is updated by the executed JMP instruction, and in particular, before the entry A 602A VALID bit 702 and BTAC 402 way replacement status for the selected BTAC 402 line is updated by the JMP instruction. Hence, the CALL instruction will see that both sides are invalid and will also update the A entry 602A according to the "always update side A when both entries are invalid" solution. This is problematic, since the target address 714 for the JMP instruction will be needlessly clobbered since an empty, i.e., invalid B entry 602B was available for caching the target address 714 of the CALL instruction.

To solve this problem, as shown in Table 1, if both the A entry 602A and B entry 602B are invalid, then the control logic 404 advantageously selects the side which is the inverse, or not, of a side stored in a global replacement status flag register, LastWritten 1502, comprised in and updated by the replacement apparatus. The LastWritten register 1502 stores an indication of whether side A or B of the BTAC 402 was last written to an invalid entry 602 of the BTAC 402 globally. Advantageously, the method uses the LastWritten register 1502 to avoid the problem illustrated by Code Sequence 1 above as described presently with respect to FIGS. 16 and 17.

Figure 16:
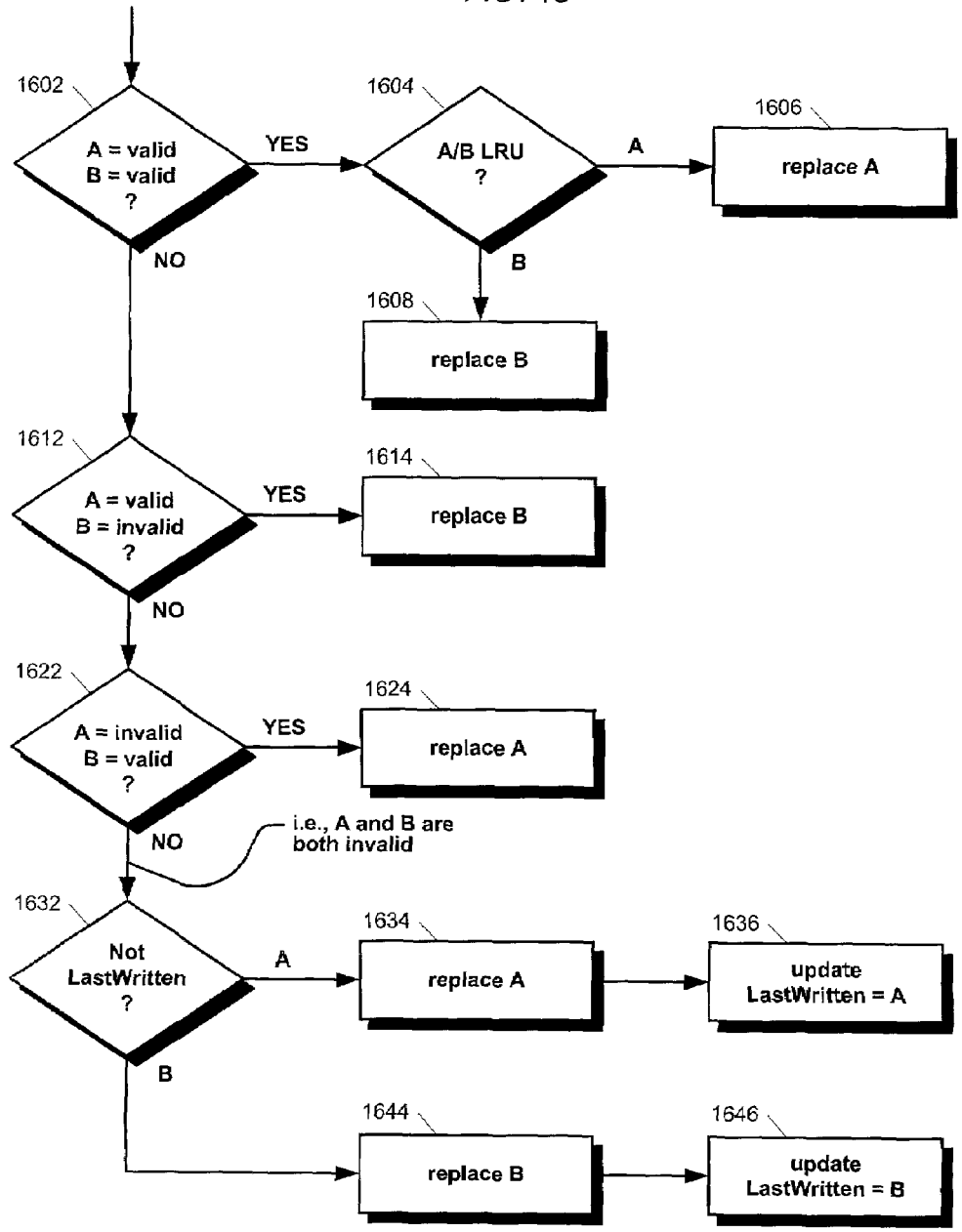
FIG. 16 is a flowchart illustrating a method of operation of the apparatus of FIG. 15 according to the present invention.

Referring now to FIG. 16, a flowchart illustrating a method of operation of the apparatus of FIG. 15 according to the present invention is shown. FIG. 16 illustrates one embodiment of Table 1 described above.

When the control logic 404 needs to update a BTAC 402 entry 602, the control logic 404 examines the VALID bit 702 for each of the selected A entry 602A and B entry 602B. The control logic 404 determines if both the A entry 602A and the B entry 602B are valid, in step 1602. If both entries are valid, the control logic 404 examines the A/B LRU bit 1504 bit to determine whether entry A 602A or entry B 602B was least recently used, in step 1604. If entry A 602A was least recently used, the control logic 404 replaces entry A 602A, in step 1606. If entry B 602B was least recently used, the control logic 404 replaces entry B 602B, in step 1608.

If the control logic 404 determines during step 1602 that not both entries are valid, it determines whether the A entry 602A is valid and the B entry 602B is invalid, in step 1612. If so, the control logic 404 replaces the B entry 602B, in step 1614. Otherwise, the control logic 404 determines whether the A entry 602A is invalid and the B entry 602B is valid, in step 1622. If so, the control logic 404 replaces the A entry 602A, in step 1624. Otherwise, the control logic 404 examines the LastWritten register 1502, in step 1632.

If the LastWritten register 1502 indicates the A side of the BTAC 402 was not last written to a selected line and way in which both the A entry 602A and the B entry 602B are invalid, the control logic 404 replaces the A entry 602A, in step 1634. The control logic 404 subsequently updates the LastWritten register 1502 to specify that side A of the BTAC 402 was the last side written to a selected line and way in which both the A entry 602A and the B entry 602B were invalid, in step 1636.

If the LastWritten register 1502 indicates the B side of the BTAC 402 was not last written to a selected line and way in which both the A entry 602A and the B entry 602B are invalid, the control logic 404 replaces the B entry 602B, in step 1644. The control logic 404 subsequently updates the LastWritten register 1502 to specify that side B of the BTAC 402 was the last side written to a selected line and way in which both the A entry 602A and the B entry 602B were invalid, in step 1646.

As may be observed, the method of FIG. 16 avoids overwriting the target address of the JMP instruction with the target address of the CALL instruction in Code Sequence 1 above. Assume the LastWritten register 1502 specifies side A when the JMP instruction is executed. The control logic 404 will update the B entry 602B according to FIG. 16 and Table 1 since side B is not the last side written. Additionally, the control logic 404 will update the LastWritten register 1502 to specify the B side. Consequently, when the CALL instruction is executed, the control logic 404 will update the A entry 602A according to FIG. 16, since when the BTAC 402 was sampled, both entries were invalid, and the LastWritten register 1502 specified that side A was not the last side written. Hence, advantageously, the target address for both the JMP and CALL instructions will be cached in the BTAC 402 for subsequent speculative branching thereto.

Figure 17:
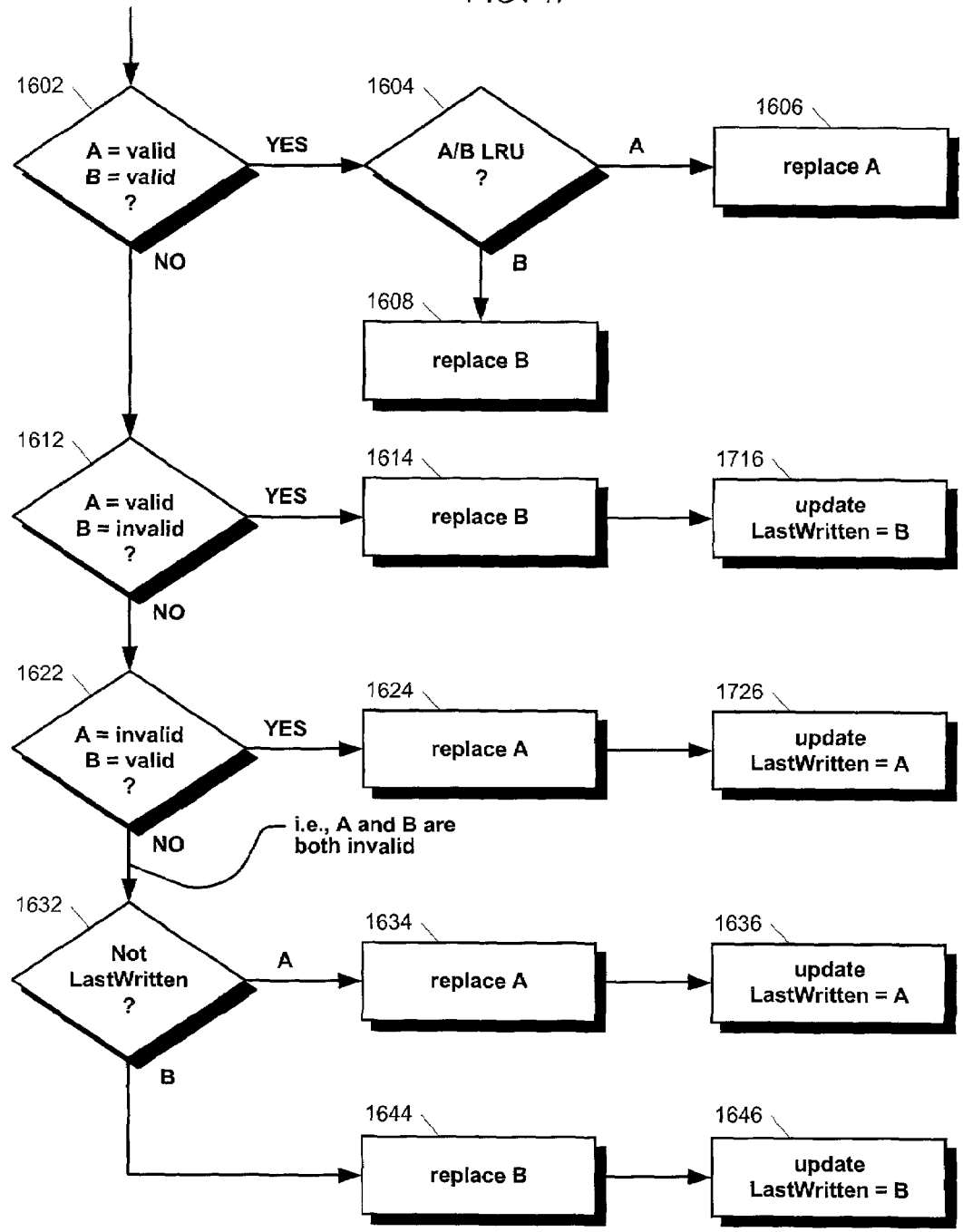
FIG. 17 is a flowchart illustrating a method of operation of the apparatus of FIG. 15 according to an alternate embodiment of the present invention.

Referring now to FIG. 17, a flowchart illustrating a method of operation of the apparatus of FIG. 15 according to an alternate embodiment of the present invention is shown. The steps of FIG. 17 are identical to the steps of FIG. 16, except that FIG. 17 includes two additional steps. In the alternate embodiment, the control logic 404 updates the LastWritten register 1502 after replacement of an invalid entry even if the other entry is valid.

Hence, in FIG. 17, after replacing entry B 602B during step 1614, the control logic 404 updates the LastWritten register 1502 to specify side B, in step 1716. Additionally, after replacing entry A 602A during step 1624, the control logic 404 updates the LastWritten register 1502 to specify side A, in step 1726.

Although simulations have revealed no observable performance difference between the embodiment of FIGS. 16 and 17, it is observed that the embodiment of FIG. 16 solves a problem that the embodiment of FIG. 17 does not. The problem is illustrated by Code Sequence 2 below.

0x00000010 JMP 0x12345678
    0x12345678 JMP 0x00000014
    0x00000014 JMP 0x20000000
    Code Sequence 2.

The two JMP instructions at instruction pointers 0x00000010 and 0x00000014 are in the same instruction cache 432 line and select the same line in the BTAC 402. The JMP instruction at instruction pointer 0x12345678 is in a different instruction cache 432 line from the other two JMP instructions and selects a different line in the BTAC 402 from the other two JMP instructions. Assume the following conditions when the JMP 0x12345678 instruction executes. The LastWritten register 1502 specifies side B. Both the A entry 602A and the B entry 602B in the BTAC 402 line and way selected by the instruction pointers for the JMP 0x12345678 and JMP 0x20000000 instructions are invalid. The BTAC 402 line and way selected by the instruction pointer for the JMP 0x00000014 instruction indicates the A entry 602A is valid and the B entry 602B is invalid. Assume the JMP 0x20000000 instruction executes before the JMP 0x12345678 instruction updates the BTAC 402. Consequently, the instruction pointers of the JMP 0x12345678 and JMP 0x20000000 instructions select the same way in the same BTAC 402 line.

According to both FIGS. 16 and 17, when the JMP 0x12345678 executes, the control logic 404 will replace entry A 602A with the target address of the JMP 0x12345678 during step 1634 and update the LastWritten register 1502 to specify side A during step 1636. According to both FIGS. 16 and 17, when the JMP 0x00000014 executes, the control logic 404 will replace entry B 602B with the target address of the JMP 0x00000014 during step 1614. According to FIG. 17, the control logic 404 will update the LastWritten register 1502 to specify side B during step 1716. However, according to FIG. 16, the control logic 404 will not update the LastWritten register 1502; rather, the LastWritten register 1502 will continue to specify side A. Consequently, when the JMP 0x20000000 executes, according to FIG. 17, the control logic 404 will replace the A entry 602A with the target address of the JMP 0x20000000 during step 1634, thereby needlessly clobbering the target address of the JMP 0x12345678. In contrast, according to FIG. 16, when the JMP 0x20000000 executes, the control logic 404 will replace the B entry 602B during step 1644, thereby advantageously leaving the target address of the JMP 0x12345678 in the A entry 602A intact.

Figure 18:
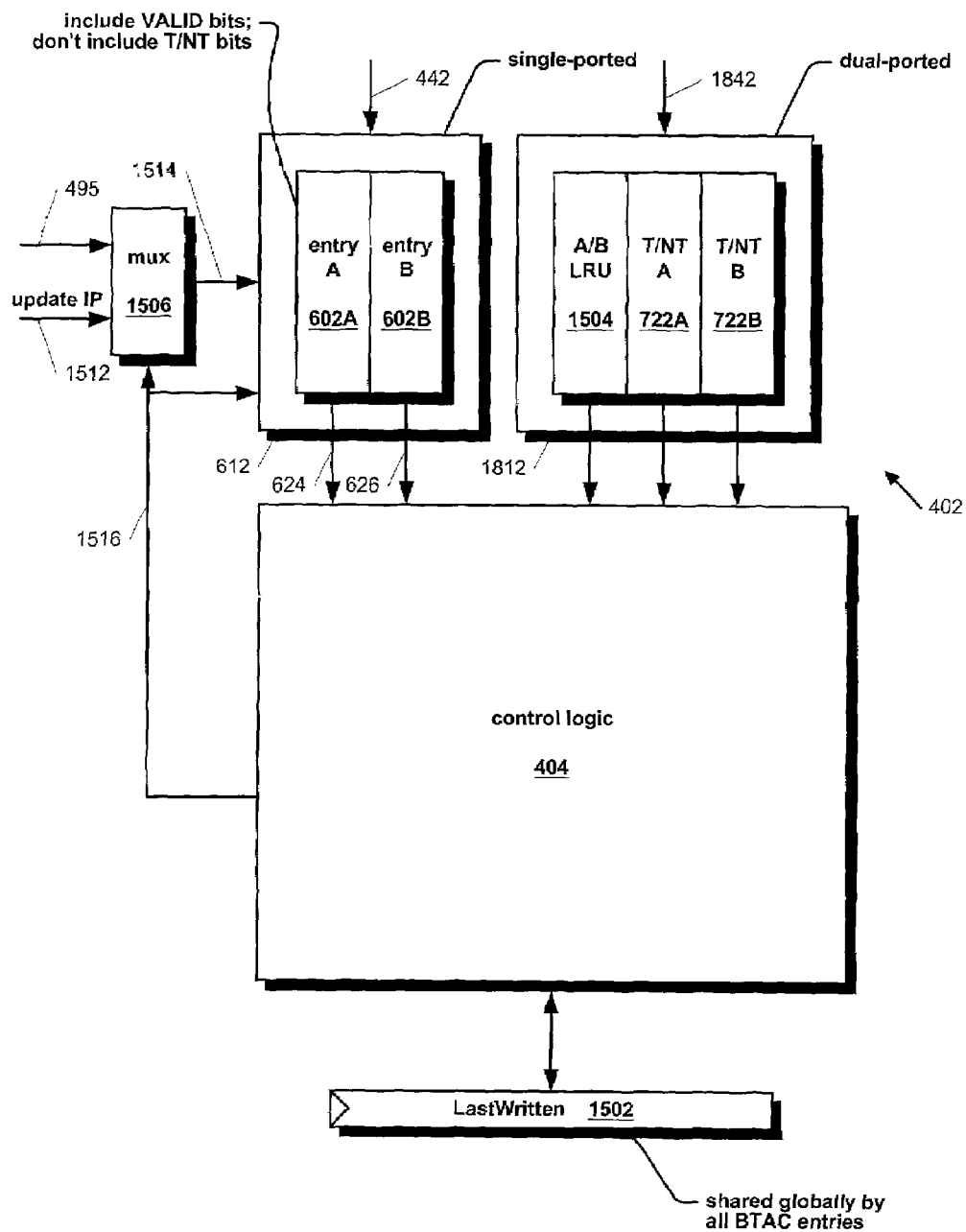
FIG. 18 is a block diagram illustrating an apparatus for replacing a target address in the BTAC of FIG. 4 according to an alternate embodiment of the present invention.

Referring now to FIG. 18, a block diagram illustrating an apparatus for replacing a target address in the BTAC 402 of FIG. 4 according to an alternate embodiment of the present invention is shown. The embodiment of FIG. 18 is similar to the embodiment of FIG. 15. However, in the embodiment of FIG. 18, the A/B LRU bit 1504 and T/NT bits 722 for both entries, shown as T/NT A 722A and T/NT B 722B, are stored in a separate array 1812 rather than in the data array 612.

The additional array 1812 is dual-ported; whereas, the data array 612 is single-ported. Because the A/B LRU bit 1504 and T/NT bits 722 are updated more frequently than the rest of fields in the entry 602, providing dual-ported access to the more frequently updated fields reduces the likelihood of a bottleneck being created at the BTAC 402 during periods of high traffic. However, since dual-ported cache arrays are larger than single-ported cache arrays and consume more power, the less frequently accessed fields are stored in the single-ported data array 612.

Figure 19:
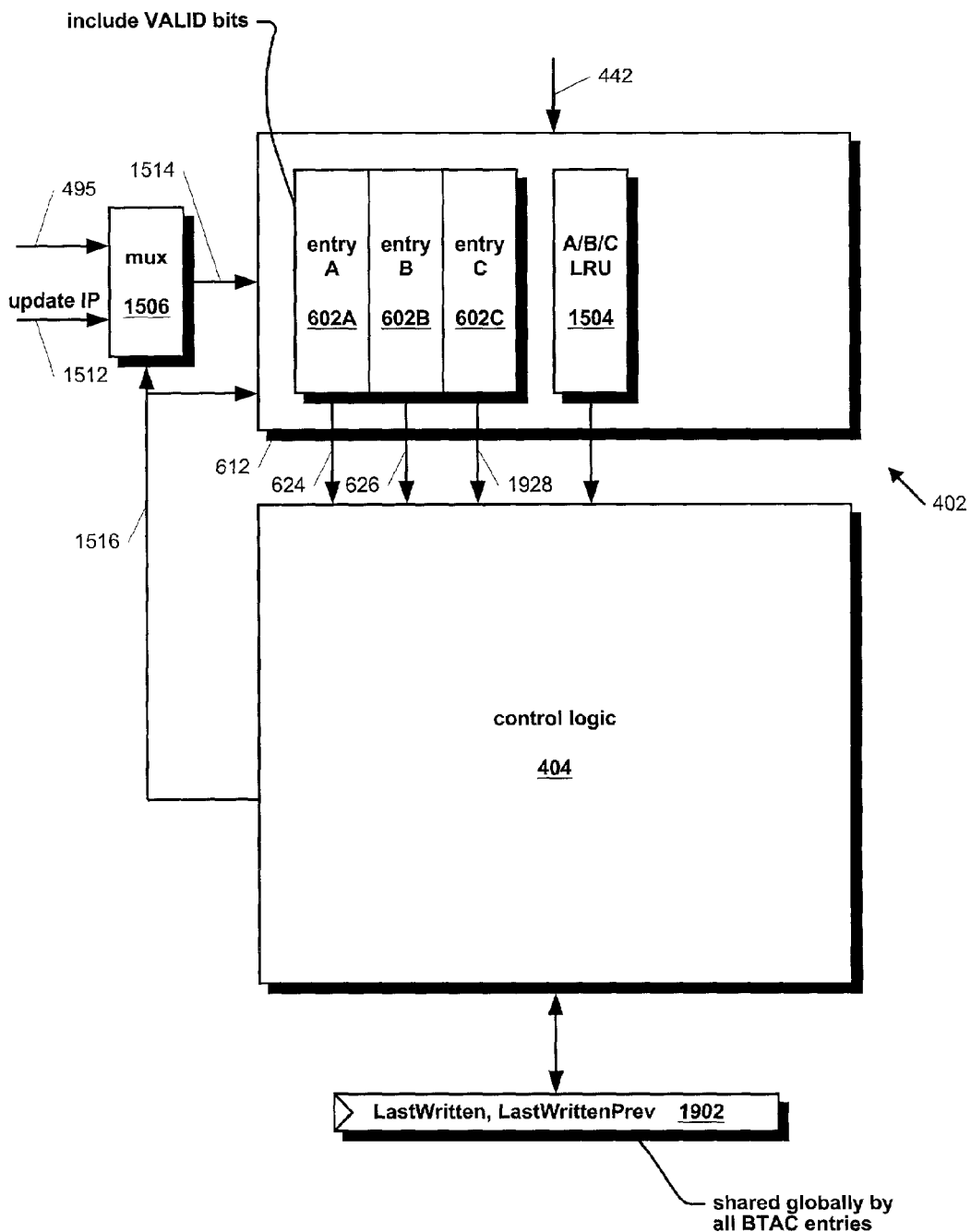
FIG. 19 is a block diagram illustrating an apparatus for replacing a target address in the BTAC of FIG. 4 according to an alternate embodiment of the present invention.

Referring now to FIG. 19, a block diagram illustrating an apparatus for replacing a target address in the BTAC 402 of FIG. 4 according to an alternate embodiment of the present invention is shown. The embodiment of FIG. 19 is similar to the embodiment of FIG. 15. However, the embodiment of FIG. 19 includes a third entry, entry C 602C, per BTAC 402 line and way. Entry C 602C is provided to the control logic 404 via signals 1928. Advantageously, the embodiment of FIG. 19 supports the ability to speculatively branch to any of three branch instructions cached in a corresponding instruction cache 432 line selected by the fetch address 495, or in one embodiment to any of three branch instructions cached in a corresponding instruction cache 432 half-line.

In addition, instead of the LastWritten register 1502, embodiment of FIG. 19 includes a register 1902 that includes both a LastWritten value and a LastWrittenPrev value. When the LastWritten value is updated, the control logic 404 copies the contents of the LastWritten value to the LastWrittenPrev value prior to updating the LastWritten value. Together, the LastWritten and LastWrittenPrev values enable the control logic 404 to determine which of the three entries is the least recently written, as described presently in Table 2 and equations following.

TABLE 2

| Valid A | Valid B | Valid C | Replace |
|---------|---------|---------|---------|
| 0 | 0 | 0 | LRW |
| 0 | 0 | 1 | LRWofAandB |
| 0 | 1 | 0 | LRWofAandC |
| 0 | 1 | 1 | A |

TABLE 2-continued

| Valid A | Valid B | Valid C | Replace |
|---------|---------|---------|---------|
| 1 | 0 | 0 | LRWofBandC |
| 1 | 0 | 1 | B |
| 1 | 1 | 0 | C |
| 1 | 1 | 1 | LRU |

LRW = AOlderThanB ? LRWofAandC : LRWofBandC
LRWofAandB = AOlderThanB ? A : B
LRWofAandC = AOlderThanC ? A : C
LRWofBandC = BOlderThanC ? B : C
AOlderThanB = (lw == B) | ((lwp == B & (lw != A))
BOlderThanC = (lw == C) | ((lwp == C & (lw != B))
AOlderThanC = (lw == C) | ((lwp == C & (lw != A))

Table 2 is similar to Table 1, except that it has three inputs, including the additional VALID bit 702 for entry C 702C. In the equations, "lw" corresponds to the LastWritten value and "lwp" corresponds to the LastWrittenPrev value. In one embodiment, LastWritten and LastWrittenPrev are updated only when all three entries are invalid, analogous to the method of FIG. 16. In an alternate embodiment, LastWritten and LastWrittenPrev are updated any time the control logic 404 updates to an invalid entry, analogous to the method of FIG. 17.

Although the present invention and its objects, features, and advantages have been described in detail, other embodiments are encompassed by the invention. For example, the BTAC may be arranged in any number of cache arrangements, including direct-mapped, fully associative, or different number of way caches. Furthermore, the size of the BTAC may be increased or decreased. Also, a fetch address other than the fetch address of the line actually containing the branch instruction being predicted may be used to index the BTAC and branch history table. For example, the fetch address of the previous fetch may be used to reduce the size of a bubble introduced before branching. Additionally, the number of target addresses stored in each way of the cache may be varied. In addition, the size of the branch history table may vary and the number of bits and form of the direction prediction information stored therein may vary as well as the algorithm for indexing the branch history table. Furthermore, the size of the instruction cache may vary and the type of virtual fetch address used to index the instruction cache and BTAC may vary.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A microprocessor, comprising:
   a branch target address cache (BTAC), configured to cache, for each of a plurality of previously executed branch instructions: a prediction of whether said branch instruction will be taken and is present in a cache line of instruction bytes provided by an instruction cache in response to a fetch address, a target address of said branch instruction, and a location of an opcode byte of said branch instruction within said cache line;
   wherein said BTAC is further configured to provide said prediction, said target address, and said location in response to said fetch address;
   an instruction buffer, coupled to receive said cache line from said instruction cache and to mark a byte in said cache line within said instruction buffer indicated by said location provided by said BTAC if the microprocessor branches to said target address provided by said BTAC based on said prediction;
   an instruction decoder, coupled to said instruction buffer, configured to format said instruction bytes in said cache line into formatted instructions; and
   prediction check logic, coupled to said instruction decoder, configured to indicate the microprocessor erroneously branched to said target address if said instruction decoder indicates said marked byte is in a non-opcode location within one of said formatted instructions.

2. The microprocessor of claim 1, wherein said marked byte is in a non-opcode location within one of said formatted instructions because said BTAC is accessed by a virtual address version of said fetch address, whereas said instruction cache is accessed by a physical address version of said fetch address.

3. The microprocessor of claim 1, wherein said marked byte is in a non-opcode location within one of said formatted instructions because said cache line was the object of self-modifying code prior to said instruction cache providing said cache line of instruction bytes in response to said fetch address.

4. The microprocessor of claim 1, wherein said target address is provided by a speculative call/return stack in the microprocessor rather than said BTAC in response to an indication cached in said BTAC that said cache line includes a return instruction.

5. The microprocessor of claim 1, wherein said location comprises a location of a first byte of said branch instruction within said cache line.

6. A method for correcting a branch instruction misprediction in a microprocessor, the method comprising:
   caching in a branch target address cache (BTAC), for each of a plurality of previously executed branch instructions: a prediction of whether said branch instruction will be taken and is present in a cache line of instruction bytes provided by an instruction cache in response to a fetch address, a target address of the branch instruction, and a location of an opcode byte of the branch instruction within said cache line;
   providing said cache line to an instruction buffer, by said instruction cache in response to said fetch address;
   providing said prediction, said target address, and said location by said BTAC in response to said fetch address;
   branching to said target address provided by said BTAC based on said prediction;
   marking a byte in said cache line within said instruction buffer indicated by said location provided by said BTAC;
   formatting, by an instruction decoder, said instruction bytes in said cache line into formatted instructions; and
   indicating the microprocessor erroneously branched to said target address, if said instruction decoder indicates said marked byte is in a non-opcode location within one of said formatted instructions.

7. The method of claim 6, further comprising:
   invalidating an entry in said BTAC caching said prediction, said target address, and said location, if said instruction decoder indicates said marked byte is in a non-opcode location within one of said formatted instructions.

8. The method of claim 6, further comprising:

flushing said instruction buffer, if said instruction decoder indicates said marked byte is in a non-opcode location within one of said formatted instructions.

9. The method of claim 6, further comprising:

branching the microprocessor to a current instruction pointer, if said instruction decoder indicates said marked byte is in a non-opcode location within one of said formatted instructions.

10. The method of claim 6, further comprising:

flushing pipeline stages of the microprocessor above said instruction decoder, if said instruction decoder indicates said marked byte is in a non-opcode location within one of said formatted instructions.

11. The method of claim 6, wherein said providing said cache line and said providing said prediction, said target address, and said location are performed substantially in parallel.

12. The microprocessor of claim 1, wherein said instruction decoder is further configured to indicate whether each of said formatted instructions is a non-branch instruction, wherein said prediction check logic is further configured to indicate the microprocessor erroneously branched to said target address, if said instruction decoder indicates one of said formatted instructions is a non-branch instruction and if said instruction buffer has marked a byte of said one of said formatted instructions.

13. The microprocessor of claim 1, wherein said BTAC is further configured to cache a length of each of said previously executed branch instructions, wherein said instruction decoder is further configured to determine a length of each of said formatted instructions, wherein said prediction check logic is further configured to indicate the microprocessor erroneously branched to said target address, if said length of one of said formatted instructions determined by said instruction decoder does not match said length of said one of said formatted instructions cached by said BTAC.

14. The method of claim 6, further comprising:

indicating, by the instruction decoder, whether each of said formatted instructions is a non-branch instruction, after said formatting; and indicating the microprocessor erroneously branched to said target address, if said instruction decoder indicates one of said formatted instructions is a non-branch instruction and if said instruction buffer has marked a byte of said one of said formatted instructions.

15. The method of claim 6, further comprising:

caching in said BTAC, for each of each of said previously executed branch instructions a length thereof;

determining, by said instruction decoder, a length of each of said formatted instructions, after said formatting; and indicating the microprocessor erroneously branched to said target address, if said length of one of said formatted instructions determined by said instruction decoder does not match said length of said one of said formatted instructions cached by said BTAC.

* * * * *